United States Patent
Watanabe et al.

(10) Patent No.: US 8,181,549 B2
(45) Date of Patent: May 22, 2012

(54) STEERING APPARATUS

(75) Inventors: Katsuji Watanabe, Saitama (JP); Yasuo Shimizu, Saitama (JP); Tsuyoshi Matsuo, Saitama (JP); Yousuke Tanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 597 days.

(21) Appl. No.: 12/384,181

(22) Filed: Apr. 1, 2009

(65) Prior Publication Data

US 2009/0250288 A1 Oct. 8, 2009

(30) Foreign Application Priority Data

Apr. 3, 2008 (JP) .................... 2008-097499
Apr. 4, 2008 (JP) .................... 2008-098209

(51) Int. Cl.
*F16H 55/22* (2006.01)
*F16H 1/04* (2006.01)
*F16H 35/00* (2006.01)

(52) U.S. Cl. .................... 74/458; 74/388 PS; 74/422
(58) Field of Classification Search ............ 74/388 PS, 74/416, 417, 422, 425, 457, 458, 462
See application file for complete search history.

(56) References Cited

U.S. PATENT DOCUMENTS

| | | | | |
|---|---|---|---|---|
| 3,079,808 A | * | 3/1963 | Wildhaber | 74/458 |
| 3,814,962 A | * | 6/1974 | Baermann | 310/103 |
| 4,222,282 A | * | 9/1980 | Taig | 74/457 |
| 5,596,904 A | * | 1/1997 | Wada et al. | 74/422 |
| 6,276,226 B1 | | 8/2001 | Fujiwara | |
| 7,604,088 B2 | | 10/2009 | Nishizaki et al. | |
| 2005/0235768 A1 | * | 10/2005 | Shimizu et al. | 74/425 |
| 2007/0227279 A1 | * | 10/2007 | Watanabe et al. | 74/89.14 |
| 2008/0223163 A1 | | 9/2008 | Yamazaki et al. | |

FOREIGN PATENT DOCUMENTS

| | | |
|---|---|---|
| JP | 2-038379 U | 3/1990 |
| JP | 3-234948 A | 10/1991 |
| JP | 7-215224 A | 8/1995 |
| JP | 2000-130560 A | 5/2000 |
| JP | 2001-133343 A | 5/2001 |
| JP | 2001-163228 A | 6/2001 |
| JP | 2001-198730 A | 7/2001 |
| JP | 2003-106393 A | 4/2003 |
| JP | 2004-223813 A | 8/2004 |
| JP | 2005-199776 A | 7/2005 |
| JP | 2005-319971 A | 11/2005 |
| JP | 2006-077809 | 3/2006 |

* cited by examiner

*Primary Examiner* — Thomas R Hannon
*Assistant Examiner* — Phillip A Johnson
(74) *Attorney, Agent, or Firm* — Carrier Blackman & Associates, P.C.; Joseph P. Carrier; William D. Blackman

(57) ABSTRACT

An electric power steering apparatus 10 has an electric motor 46 for supplying an auxiliary force to a steering force inputted from a steering wheel 16, and transmits the steering force including the auxiliary force to a steered road-wheel 14 at least partially via a rack-and-pinion mechanism 30, thereby performing steering of a vehicle 12. The rack-and-pinion mechanism 30 includes: a pinion 38 provided at a pinion shaft 28 connected to the steering wheel 16; a rack 40 that is provided over a predetermined width at a rack shaft 32 connected to the steered road-wheel 14, and that is engaged with the pinion 38; and a rack guide 70 for urging the rack shaft 32 toward the pinion 38. A pressure angle $\alpha 1$ of a tooth root of the rack 40 is set to be greater than a pressure angle $\alpha 0$ of a tooth tip of the rack 40.

7 Claims, 17 Drawing Sheets

STEERING APPARATUS

BACKGROUND OF THE INVENTION

1. Field of the Invention

The present invention relates to steering apparatuses including a rack-and-pinion mechanism having at least a set of gears.

2. Description of Related Art

In a steering apparatus for a vehicle, an electric power steering apparatus in which an auxiliary force from a motor is imparted to a steering force inputted from a steering wheel, and this steering force is transmitted to a steered road-wheel side via a rack-and-pinion mechanism, is widely used.

For example, Japanese Patent Unexamined Publication JP-A-2005-199776 proposes an electric power steering apparatus. In the proposed electric power steering apparatus, it is aimed to: increase, to the extent possible, a pressure angle of a pinion provided at a pinion shaft connected to a steering wheel, thereby reducing engagement friction between the pinion and a rack provided at a rack shaft connected to a wheel; and appropriately set tooth specifications, thereby obtaining a favorable operation feeling.

SUMMARY OF THE INVENTION

In recent years, with the increase in vehicle weight, the flattening of tires, a load applied to a rack shaft has tended to increase, and to cope with this, a rack-and-pinion mechanism having higher load capability has been desired.

Further, when a road surface reaction force is transmitted from a steered road-wheel to a rack shaft during running and/or steering, deflection might be caused at the rack shaft formed into a relatively elongated shape, and an error might occur in the engagement of a pinion and a rack.

Furthermore, it is also conceivable that due to an impact transmitted from a road surface to a steering wheel via a rack-and-pinion mechanism, such as so-called "kickback", a greater load might act on a portion at which the pinion and the rack are engaged. In this case, the tooth of the rack is formed by cutting the rack shaft whose cross section is a long circular shaft, and the rack and pinion engagement is ensured only by supporting a circular back face of the rack by a rack guide mechanism. Accordingly, a rotation of the rack shaft around its axial direction might also cause a deviation in the engagement relationship between teeth of the rack and the pinion.

If an error, a deviation or the like has occurred in the rack and pinion engagement as described above, a contact relationship between tooth surfaces is changed. Thus, although in the normal state, the teeth of the rack and the pinion are brought into contact with each other normally via two pairs of teeth, in such a case, the teeth of the rack and the pinion might be brought into contact with each other via only one pair of teeth. Even in such a case, it is required to ensure durability by reducing stress concentration or the like so as to suppress tooth breakage or the like, and to maintain an operation feeling by retaining engagement accuracy.

The present invention has been made in view of the above-described conventional problems, and its object is to provide a steering apparatus capable of further improving durability and engagement accuracy of gears constituting a rack-and-pinion mechanism.

According to an aspect of the invention, there is provided a steering apparatus including:

a steering system including:
a pinion shaft connected to a steering wheel; and
a rack shaft connected to a steered road-wheel; and
a rack-and-pinion mechanism including:
a pinion provided at the pinion shaft; and
a rack engaging with the pinion and provided at the rack shaft,
wherein a pressure angle of a tooth root of the rack is greater than that of a tooth tip of the rack.

In such a structure, the pressure angle of the rack at the tooth root is set to be greater than that of the rack at the tooth tip. Thus, when the rack is rotated around its axial direction, the rack is effectively prevented from biting into the tooth root side of the pinion, and the tooth root side of the rack abuts against the pinion before the tooth tip side of the rack abuts against the pinion. Accordingly, since the tooth root side of the rack, which is thicker and stronger, is allowed to abut against the pinion, the bending moment of the rack is reduced, thereby making it possible to maintain and improve the durability and engagement accuracy of the rack-and-pinion mechanism, and to improve the operation feeling of the steering apparatus.

In this case, if the rack is set to have an approximate arc shape in which the pressure angle is gradually increased from the tooth tip to the tooth root, the rack and the pinion are brought into contact with each other through the arc shape, and a load applied to a contact portion is distributed therethrough, thereby making it possible to improve not only the bending strength of the rack but also that of the pinion.

According to the present invention, the pressure angle of the rack at the tooth root is set to be greater than that of the rack at the tooth tip. Thus, when the rack is rotated around its axial direction, the rack is effectively prevented from biting into the tooth root side of the pinion, and the tooth root side of the rack abuts against the pinion before the tooth tip side of the rack abuts against the pinion. Accordingly, since the tooth root side of the rack, which is thicker and stronger, is allowed to abut against the pinion, the bending moment of the rack is reduced. Therefore, it is made possible to maintain and improve the durability and engagement accuracy of the rack-and-pinion mechanism, and to improve the operation feeling of the steering apparatus.

DETAILED DESCRIPTION OF EXEMPLARY EMBODIMENTS OF THE PRESENT INVENTION

Hereinafter, preferred embodiments of electric power steering apparatuses according to the present invention will be described in detail with reference to the appended drawings.

Figure 1:
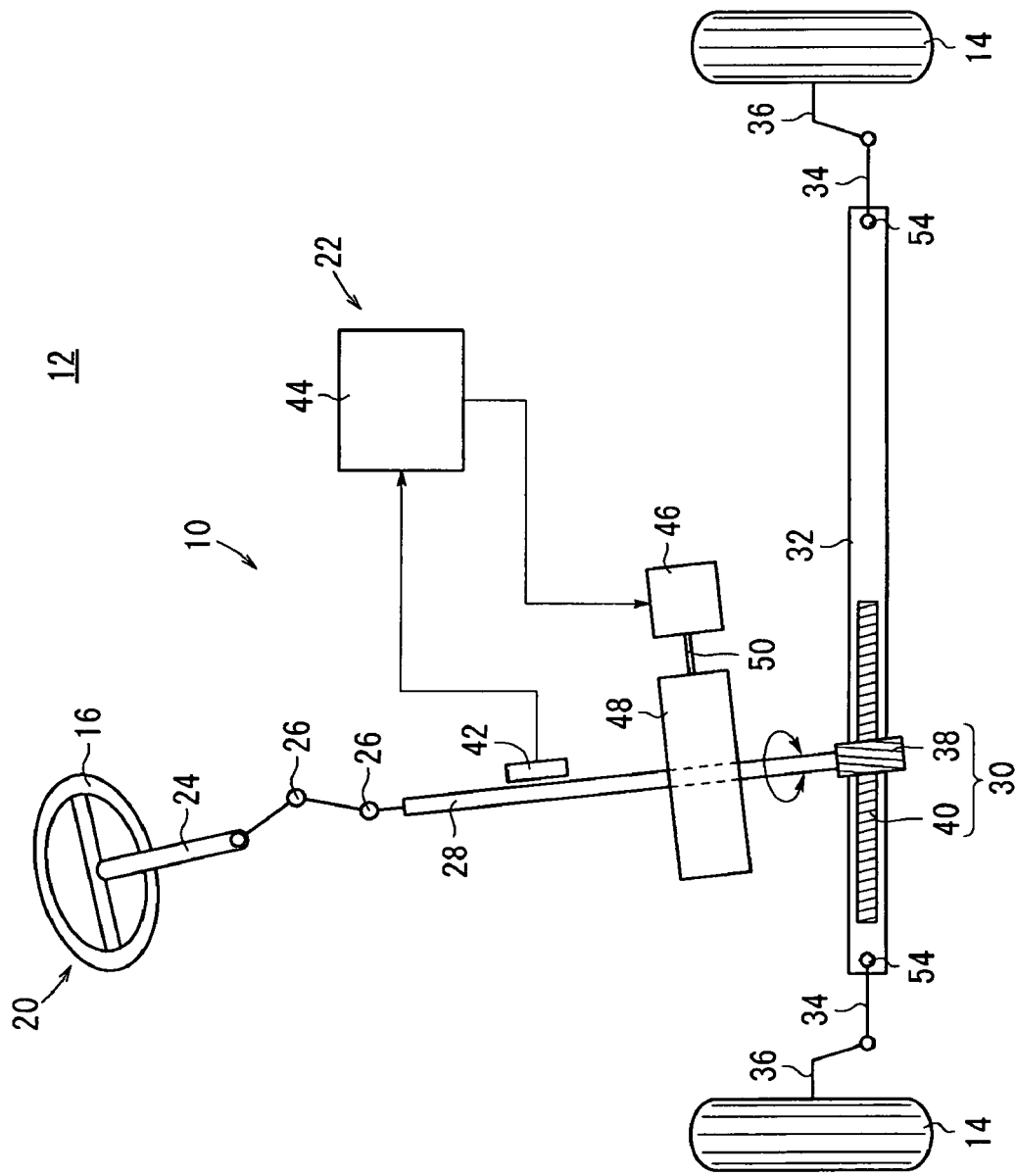
FIG. 1 is an explanatory diagram schematically showing an electric power steering apparatus according to one embodiment of the present invention.

FIG. 1 is an explanatory diagram schematically showing an electric power steering apparatus 10 according to one embodiment of the present invention. The electric power steering apparatus 10 according to the present embodiment is a so-called "electric power steering apparatus", which is installed on a side of a steered road-wheel (front wheel) 14 of a vehicle 12 such as a four-wheeled vehicle and thus serves to steer the vehicle 12.

As shown in FIG. 1, the electric power steering apparatus 10 includes: a steering system 20 extending from a steering wheel 16 of the vehicle 12 to reach both of steered road-wheels 14, 14; and an auxiliary torque mechanism 22 for adding an auxiliary torque (auxiliary force) to a steering torque (steering force) provided by the steering system 20.

In the steering system 20, a pinion shaft (rotation shaft) 28 is connected to the steering wheel 16 via a steering shaft 24 and universal couplings 26, 26; a rack shaft 32 is connected to the pinion shaft 28 via a rack-and-pinion mechanism 30; and the steered road-wheels 14, 14 is connected to ends of the rack shaft 32 via right and left tie rods 34, 34 and knuckles 36, 36.

The rack-and-pinion mechanism 30 is so-called rack-and-pinion gears through which a rack 40 (see FIG. 5A) formed at the rack shaft 32 is engaged with a pinion 38 formed at the pinion shaft 28. Via this rack-and-pinion mechanism 30, the pinion 38 is connected to the steering wheel 16, and the rack 40 is connected to the steered road-wheels 14, 14. Accordingly, a driver steers the right and left steered road-wheels 14, 14 via the rack-and-pinion mechanism 30 and right and left tie rods 34, 34 by using a steering torque generated by steering the steering wheel 16.

The auxiliary torque mechanism 22 has a steering torque sensor 42 for detecting a steering torque of the steering system 20 which is applied by the steering wheel 16, and a control signal, generated based on a torque detection signal sent from the steering torque sensor 42, is transmitted from a control section 44 to an electric motor (drive source) 46. The electric motor 46 serves to generate an auxiliary torque in response to the steering torque. The auxiliary torque is transmitted to the rack-and-pinion mechanism 30 of the steering system 20 via a reduction mechanism 48 and the pinion shaft 28, thus making it possible to steer the right and left steered road-wheels 14, 14 through the rack-and-pinion mechanism 30 and the right and left tie rods 34, 34.

As described above, in addition to the control section 44 and the electric motor 46, the auxiliary torque mechanism 22 includes: the reduction mechanism 48 interposed between an output shaft 50 of the electric motor 46 and the pinion 38; and the steering torque sensor 42 interposed between the reduction mechanism 48 and the steering wheel 16 so as to detect the steering torque. In this embodiment, the pinion 38 serves as a gear to which an auxiliary torque generated by the electric motor 46 in response to the steering torque of the steering wheel 16 is applied.

Accordingly, since the electric power steering apparatus 10 has the auxiliary torque mechanism 22 in addition to the steering system 20, a driver is allowed to more smoothly and appropriately steer the steered road-wheels 14, 14 by means of a torque provided by combining the auxiliary torque generated by the electric motor 46 with the steering torque applied by the driver.

Figure 2:
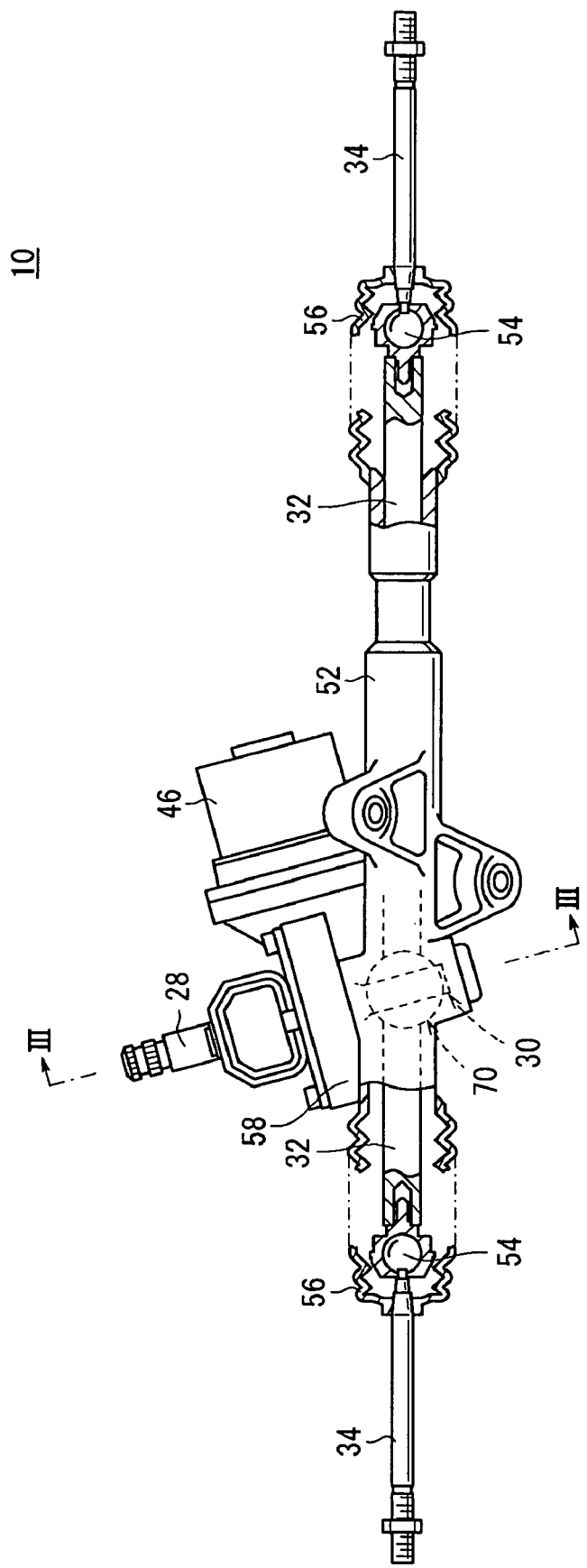
FIG. 2 is a partial cross-sectional front view showing a structure of the periphery of a rack-and-pinion mechanism of the electric power steering apparatus shown in FIG. 1.

FIG. 2 is a partial cross-sectional front view showing a structure of the periphery of the rack-and-pinion mechanism 30 of the electric power steering apparatus 10.

As shown in FIG. 2, the rack shaft 32 having the rack 40 is axially slidably accommodated in a housing 52 extending in a vehicle widthwise direction of the vehicle 12 (i.e., in the lateral direction in FIG. 2). More specifically, the rack shaft 32 is a shaft whose longitudinal ends protruded from the housing 52 is connected with the tie rods 34, 34 via ball joints 54, 54. It should be noted that the reference numerals 56 in FIG. 2 each denote a dust seal boot for protecting a connection portion between the ball joint 54 and the tie rod 34.

Figure 3:
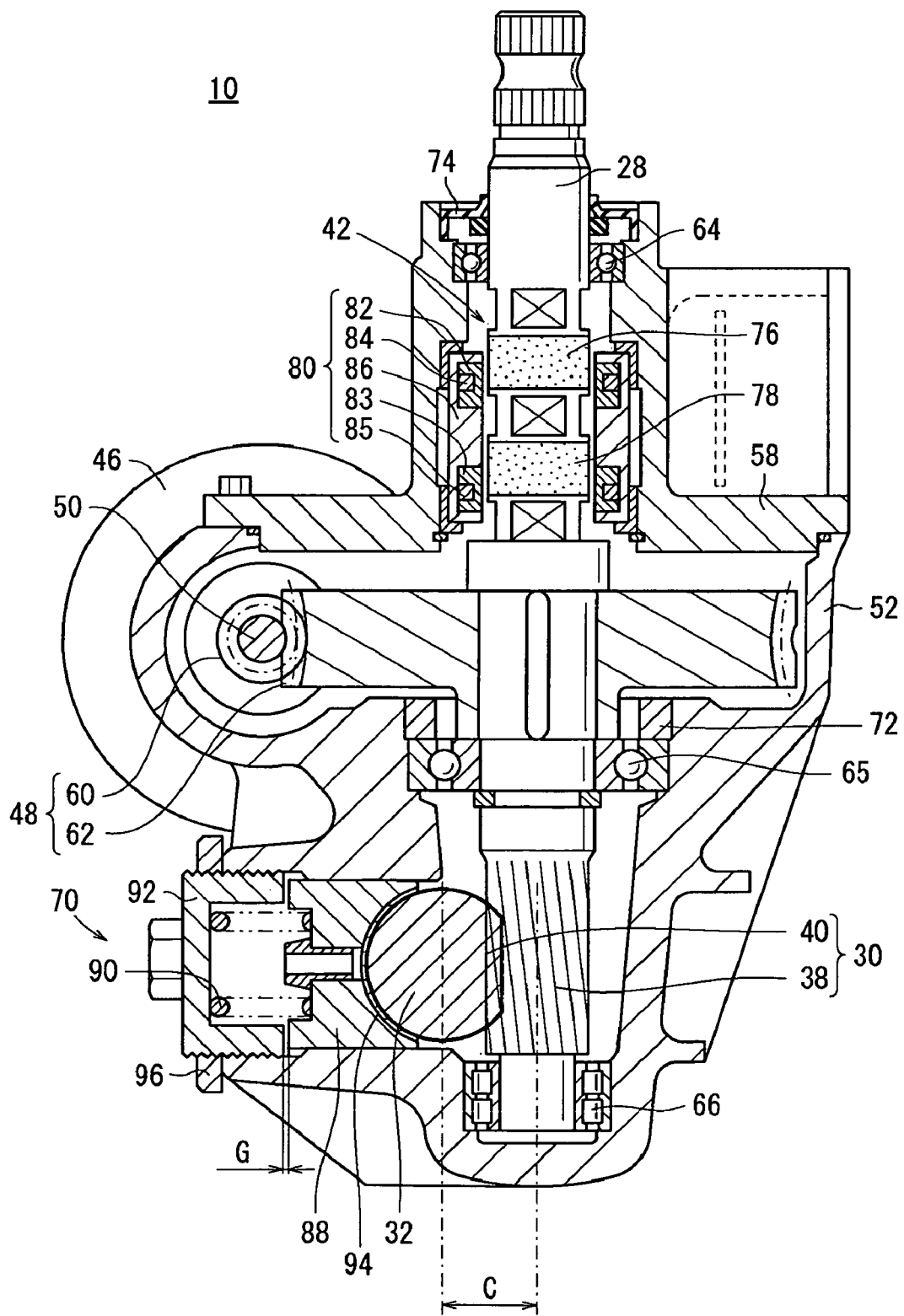
FIG. 3 is a cross-sectional view taken along the line III-III of FIG. 2.

FIG. 3 is a cross-sectional view taken along the line III-III of FIG. 2, and shows a longitudinal cross-sectional structure of the electric power steering apparatus 10.

As shown in FIG. 3, in the electric power steering apparatus 10, the pinion shaft 28, the rack-and-pinion mechanism 30, the steering torque sensor 42 and the reduction mechanism 48 are accommodated in the housing 52, and an upper opening of the housing 52 is closed by an upper cover portion 58. In this case, the electric motor 46 is attached to the housing 52, and the steering torque sensor 42 is attached to the upper cover portion 58.

Both of gears, i.e., both of the pinion 38 and the rack 40 constituting the rack-and-pinion mechanism 30 are so-called "helical gears". In other words, the pinion 38 is a "helical pinion", and the rack 40 is a "helical rack".

The reduction mechanism 48 is a worm gear mechanism, i.e., a biasing mechanism, for transmitting the auxiliary torque generated by the electric motor 46 to the pinion shaft 28. More specifically, the reduction mechanism 48 includes: a worm 60 provided at the output shaft 50 of the electric motor 46; and a worm wheel 62 (hereinafter, also simply called a "wheel 62") coupled to the pinion shaft 28 and engaged with the worm 60. It should be noted that a preferred embodiment of the reduction mechanism 48 will be described later.

The housing 52 rotatably supports vertically extending upper portion, longitudinal center portion, and lower portion of the pinion shaft 28 via three bearings 64, 65 and 66, and supports a rack guide 70 for urging the rack shaft 32 toward the pinion 38. It should be noted that in FIG. 3, the reference numeral 72 denotes a lock nut, and the reference numeral 74 denotes an oil seal.

In this case, in the steering torque sensor 42, a first permanent strain portion 76 and a second permanent strain portion 78, to each of which a permanent strain is applied to change a magnetostrictive property thereof in response to a torque acted thereon, are provided at the pinion shaft 28. A detection portion 80 for electrically detecting magnetostrictive effects generated in the first and second permanent strain portions 76 and 78 are provided around the first and second permanent strain portions 76 and 78. Thus, the steering torque sensor 42 serves as a so-called magnetostrictive type torque sensor for outputting, as a torque detection signal, a detection signal of the detection portion 80.

The first and second permanent strain portions 76 and 78 are formed of magnetostrictive films to which opposite permanent strains are applied in the axial direction (longitudinal direction) of the pinion shaft 28.

The detection portion 80 includes: tubular coil bobbins 82, 83 through which the pinion shaft 28 is inserted; a first multilayer solenoidal coil 84 and a second multilayer solenoidal coil 85 wound around the coil bobbins 82, 83; and a magnetic shield back yoke 86 surrounding the peripheries of the first and second multilayer solenoidal coils 84 and 85.

The rack guide 70 serves as a pressing means for the rack shaft 32 (the rack 40), and includes: a guide portion 88 that is abutted against the rack shaft 32 from the opposite side of the rack 40; and an adjusting bolt 92 for urging the guide portion 88 via a compression spring (adjusting spring) 90.

In normal times, e.g., in a state where the rack 40 and the pinion 38 are engaged with each other with substantially no deviation during non-running time, stable running time, etc., a slight gap G is formed between the guide portion 88 and the adjusting bolt 92 in an adjusting direction of the adjusting bolt 92. It should be noted that in FIG. 3, the reference numeral 94 denotes an abutment member that is slid along a back face of the rack shaft 32, and the reference number 96 denotes a lock nut.

As described above, for the rack-and-pinion mechanism 30, there is provided the rack guide 70 as a pressing means capable of pressing one of the pinion 38 and the rack 40 (in this embodiment, the rack 40 is pressed) in the direction in which they are engaged with each other. Thus, the rack shaft 32 is supported so as to be slidable in its axial direction and slidable in an oscillation direction around the axial direction, while the movement of the rack shaft 32 in the longitudinal direction of the pinion shaft 28 is restricted by the guide portion 88 constituting the rack guide 70.

Accordingly, in the rack guide 70, the guide portion 88 can be pressed with a suitable pressing force via the compression spring 90 by means of the adjusting bolt 92 screwed to the housing 52, and therefore, a preload can be applied to the rack 40 by the guide portion 88, thereby allowing the rack 40 to be pressed against the pinion 38. As a result, play in the engagement between the pinion 38 and the rack 40 can be maintained at a minimum level. Moreover, when the tooth of the pinion 38 and/or the tooth of the rack 40 have/has been worn, the rack shaft 32 is pressed toward the pinion 38 by the rack guide 70, thereby making it possible to maintain a favorable engagement state.

Figure 4:
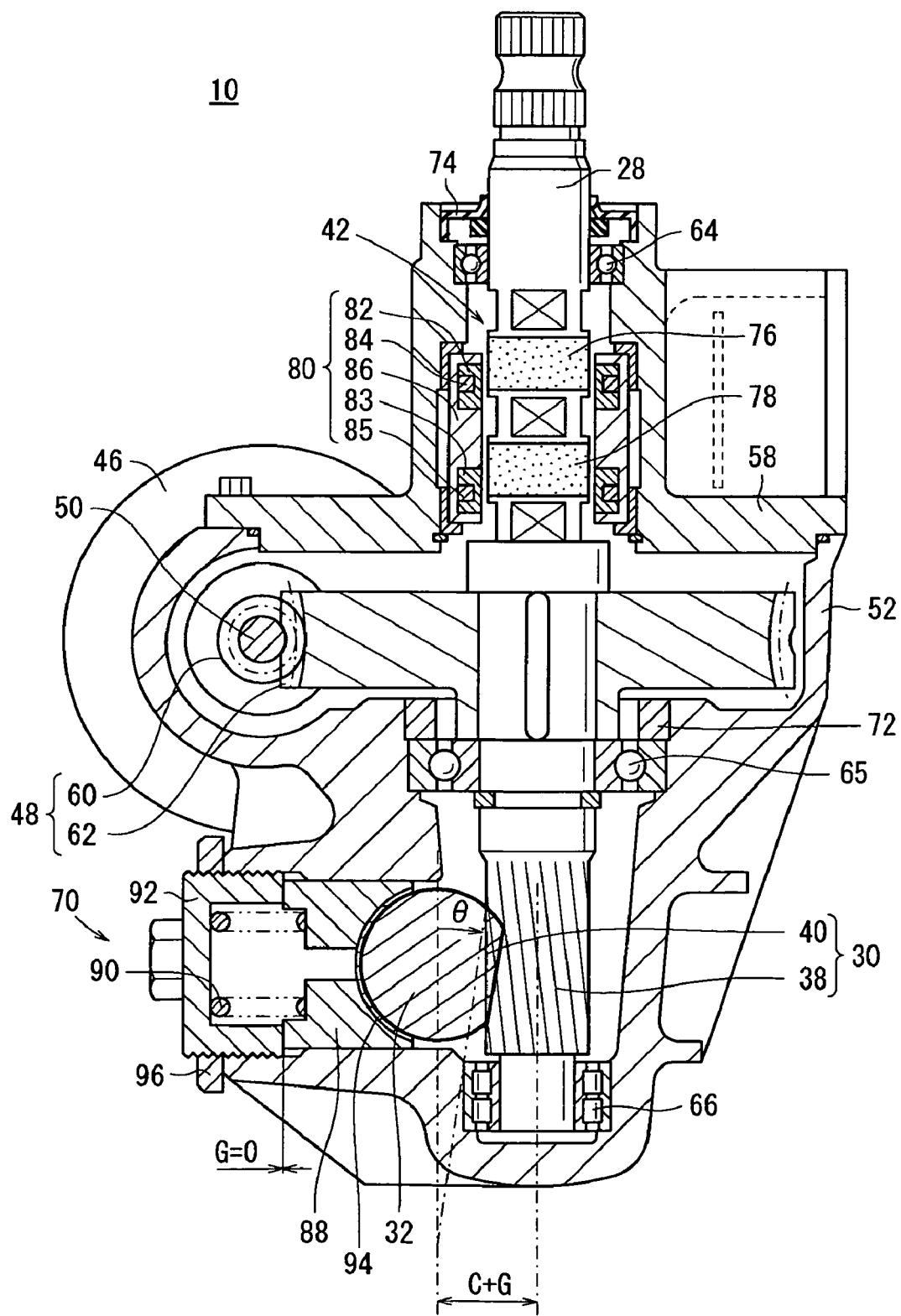
FIG. 4 is a cross-sectional view showing how a rack shaft is rotated when a load is applied to the electric power steering apparatus shown in FIG. 3.

FIG. 4 is a cross-sectional view showing how the rack shaft 32 (rack 40) is rotated when a load is applied to the electric power steering apparatus 10 shown in FIG. 3, e.g., when a large road surface reaction force is transmitted to the steered road-wheel 14 during running, for example.

As shown in FIG. 4, when the vehicle 12 has received a large road surface reaction force during running or the like, for example, the rack shaft 32 (rack 40) is slid along the abutment member 94 and rotated by a predetermined angle θ while being supported by the guide portion 88 due to a component of a rack shaft force, which results from a pressure angle. At this time, the rack 40 and the pinion 38 are deviated from each other in the direction in which they are engaged with each other, and the rack shaft 32 presses, by its back face side (curve surface opposite to the rack 40), the guide portion 88 toward the adjusting bolt 92 to move slightly backward.

Specifically, upon rotation of the rack shaft 32 around its axial direction in this manner, the gap G between the guide portion 88 and the adjusting bolt 92 is changed from a state in which certain allowance is provided as shown in FIG. 3 to a state in which no allowance is provided as shown in FIG. 4, and the gap G becomes approximately zero. Therefore, an inter-shafts distance between the rack shaft 32 and the pinion 38 is increased from a distance C shown in FIG. 3 to a distance C+G which is shown in FIG. 4 and obtained by adding the gap G to the distance C. That is, the rack 40 and the pinion 38 have a backlash G, and a play G equivalent to the added distance G is provided in the engagement between the tooth of the rack 40 and the tooth of the pinion 38. As a result, the play G serves as a gap through which the rack 40 is rotated, and the rack 40 is consequently rotated at the rotation angle (turning angle) θ.

Now, the change in the pressure angle of the rack 40 concerning the engagement with the pinion 38 when the rack shaft 32 (rack 40) is rotated will be described with reference to FIG. 5A to FIG. 6B.

Figure 5A:
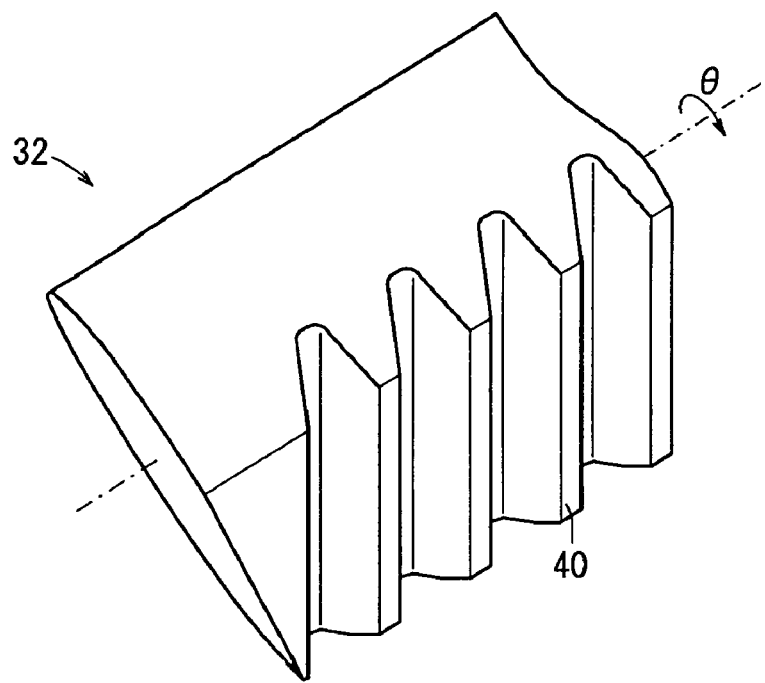
FIG. 5A is a partially omitted perspective view of a rack shaft shown in FIG. 1.
Figure 5B:
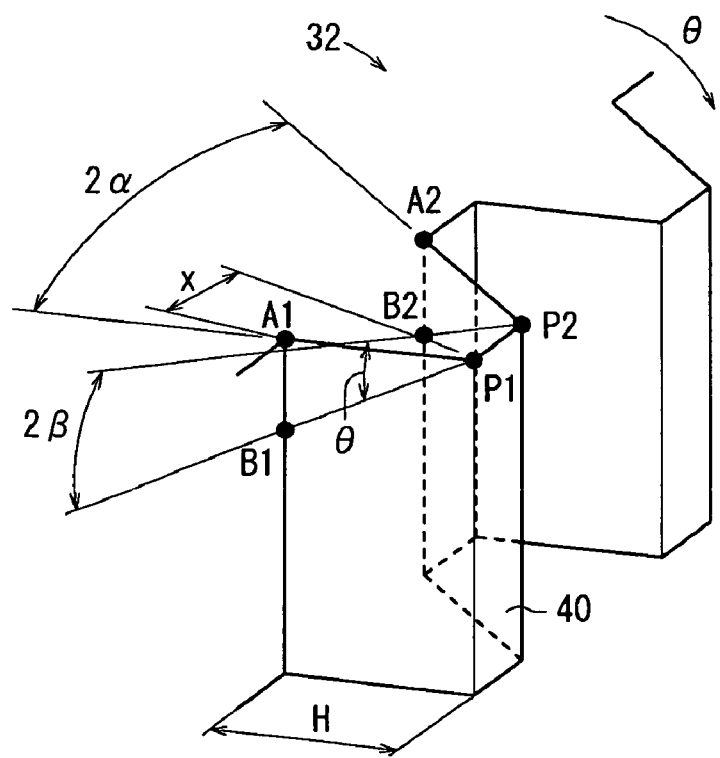
FIG. 5B is an enlarged perspective view schematically showing a principal portion of a rack shown in FIG. 5A.
Figure 6A:
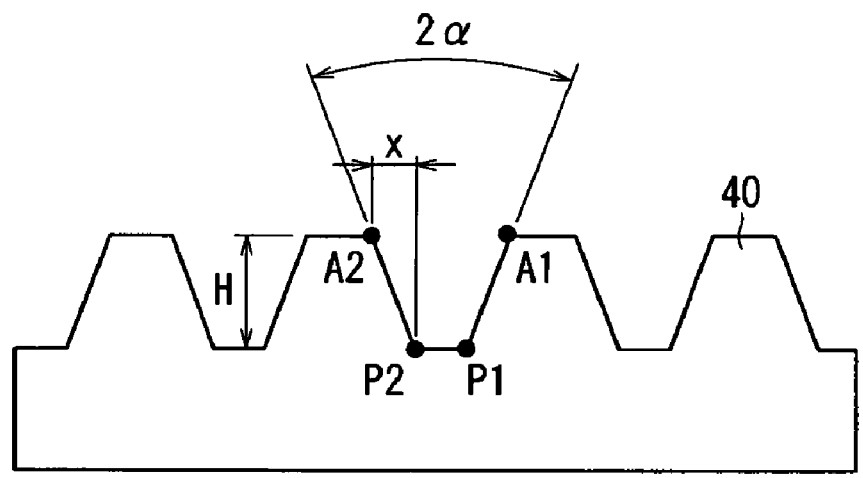
FIG. 6A is a cross-sectional view schematically showing a state of the rack shaft shown in FIG. 5A prior to rotation.
Figure 6B:
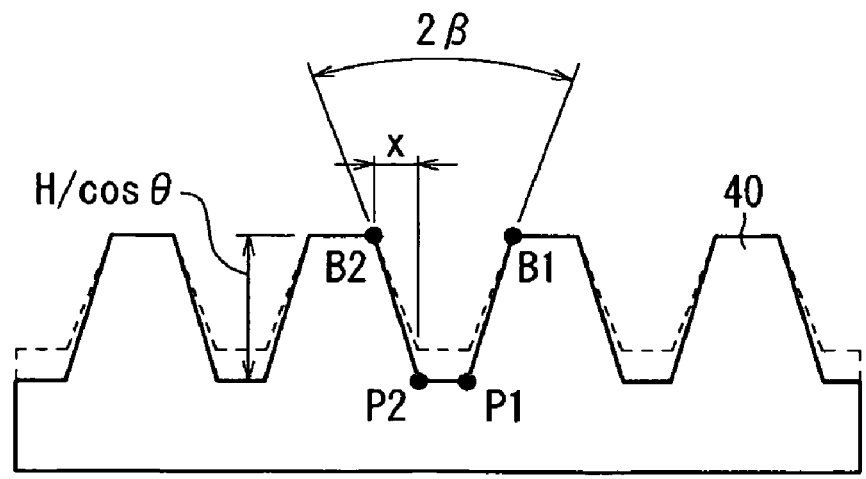
FIG. 6B is a cross-sectional view schematically showing a state of the rack shaft that has been rotated from the state shown in FIG. 6A.

FIG. 5A is a partially omitted perspective view of the rack shaft 32 provided with the rack 40, and FIG. 5B is an enlarged perspective view schematically showing a principal portion of the rack 40 shown in FIG. 5A. Further, FIG. 6A is a cross-sectional view schematically showing a state of the rack shaft 32 prior to rotation, and FIG. 6B is a cross-sectional view schematically showing a state of the rack shaft 32 that has been rotated from the state shown in FIG. 6A. It should be noted that in FIG. 6A and FIG. 6B, hatching of the cross-sectional views is omitted in order to facilitate the understanding of the drawings, and the same goes for FIG. 7A to FIG. 9B described later. Furthermore, in FIG. 5A to FIG. 6B, for simplification of description, there is shown tooth profile of the rack 40 having a shape that is used in general in conventional technologies, and more specifically, there is shown a pressure angle held constant from the tooth tip of the rack 40 to the tooth end thereof. Therefore, the tooth profile of the rack 40 shown in FIG. 5A to FIG. 6B is different in shape from that of a rack 40 (40a) according to the present embodiment shown in FIG. 8A to FIG. 9B described later.

As shown in FIG. 5A, the rack 40 is formed at one face side of the rack shaft 32. In this case, as shown in FIG. 5B and FIG. 6A, a pressure angle of the rack 40 concerning the engagement with the pinion 38 in normal times (i.e., during a time period in which the rack shaft 32 is not rotated) will be represented by α, and a tooth height (i.e., a total tooth height) during this time period will be represented by H.

On the other hand, as shown in FIG. 5B and FIG. 6B, if a pressure angle of the rack 40 at the time of rotation, i.e., when the rack shaft 32 (rack 40) is rotated by the rotation angle θ, is represented by β, a tooth height at this time will be represented by H/cos θ.

Then, as shown in FIG. 5B and FIG. 6A, in the rack 40 in normal times, an angle of intersection of: a straight line connecting a point P1 and a point A1; and a straight line connecting a point P2 and a point A2 can be represented as an angle 2α which is twice as large as the pressure angle α. On the other hand, as shown in FIG. 5B and FIG. 6B, in the rack 40 at the time of rotation, an angle of intersection of: a straight line connecting the point P1 and a point B1; and a straight line connecting the point P2 and a point B2 can be represented as an angle 2β which is twice as large as the pressure angle β.

Accordingly, as can be understood from FIG. 5B to FIG. 6B, the relationship between the pressure angle α and the pressure angle β will be considered as follows: tan α=x/H, tan β=x cos θ/H=tan α cos θ. In this case, it should be tan α>tan β because 0<cos θ<1, and the relationship between the pressure angles α and β will be obtained as α>β. In other words, upon rotation of the rack shaft 32 at the rotation angle θ, the pressure angle concerning the engagement between the pinion 38 and the rack 40 will be decreased from α to β.

Figure 7A:
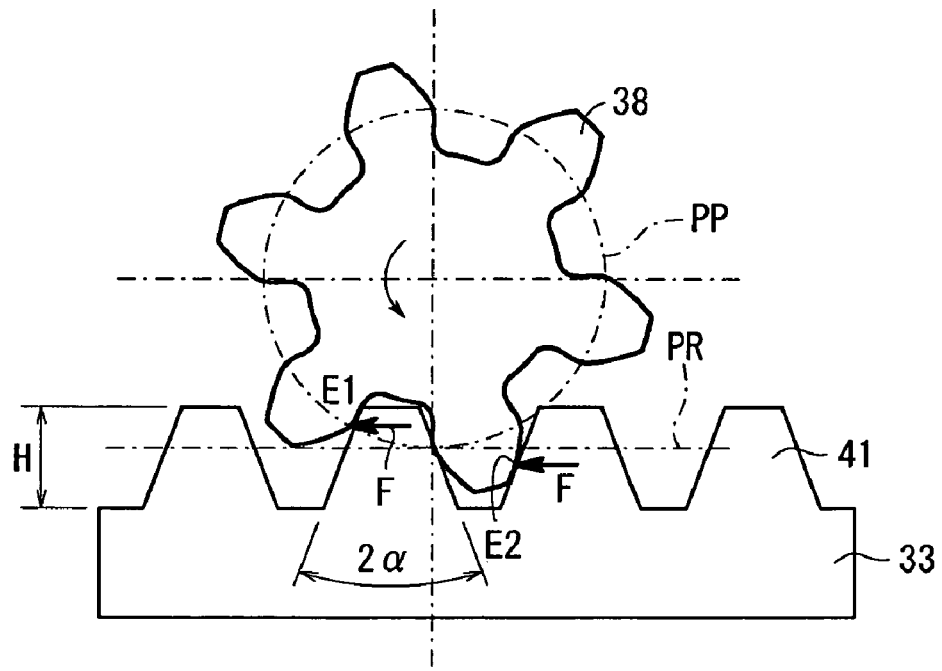
FIG. 7A is a cross-sectional view schematically showing a state of engagement between a rack having conventional tooth profile and a pinion in normal times.
Figure 7B:
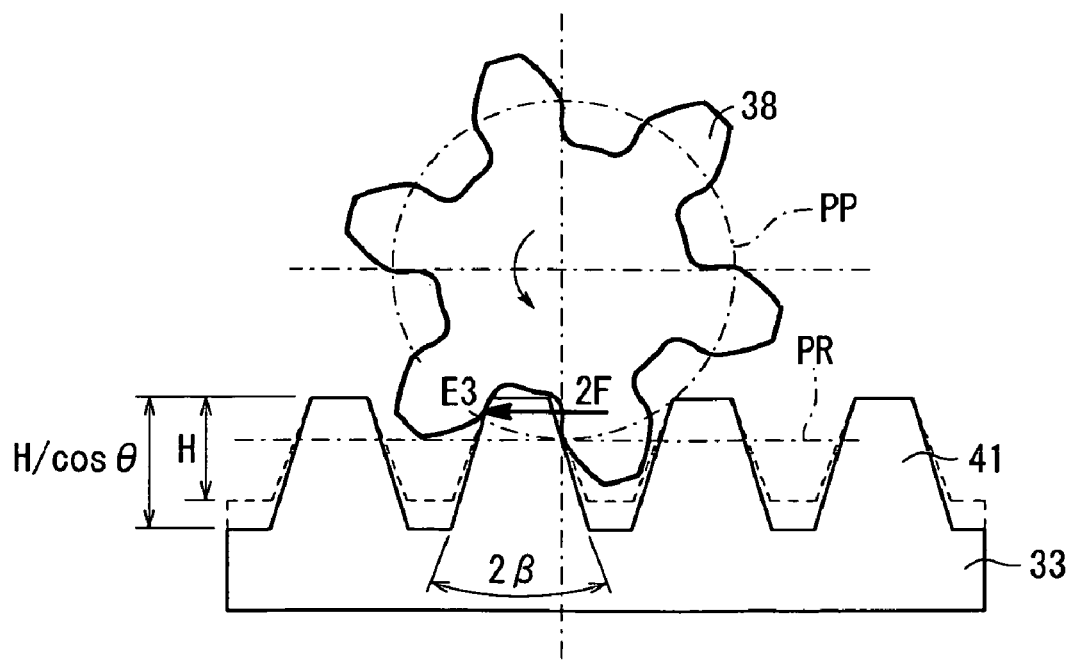
FIG. 7B is a cross-sectional view schematically showing a state of engagement between the rack and the pinion, in which a rack shaft has been rotated from the state shown in FIG. 7A.

Now, first, a state of engagement between a rack 41 and the pinion 38 in the case of using a rack shaft 33 formed with the rack 41, having conventional tooth profile or more specifically a constant pressure angle from a tooth tip to a tooth end, will be described with reference to FIG. 7A and FIG. 7B. FIG. 7A is a cross-sectional view schematically showing a state of engagement between the rack 41 having conventional tooth profile and the pinion 38 in normal times, and FIG. 7B is a cross-sectional view schematically showing a state of engagement between the rack 41 and the pinion 38, in which the rack shaft 33 has been rotated by the rotation angle θ from the state shown in FIG. 7A. It should be noted that in FIG. 7A and FIG. 7B, a pitch line of the rack 41 is denoted by PR while a pitch line of the pinion 38 is denoted by PP, and the same goes for the following description.

As shown in FIG. 7A, in normal times (i.e., during a time period in which the rack shaft 33 is not rotated), this rack 41 is engaged with the pinion 38 at two engagement points E1 and E2, and a load F is equally applied on each of the engagement points E1 and E2. It should be noted that the tooth profile of the pinion 38, located between the pitch line PP and the tooth tip, is formed into an approximate arc shape.

On the other hand, as shown in FIG. 7B, at the time of rotation, i.e., in a state in which the rack shaft 33 (rack 41) is rotated by the rotation angle θ, the pressure angle of engagement of the rack 41 is decreased from α to β as mentioned above. Therefore, a load is concentrated only on an engagement point E3 between the tooth tip of the rack 41 and the tooth root of the pinion 38, and a load 2F, which is twice as large as the load F, will be applied on the single point. This is because, as can be understood from FIG. 7B, the actual pressure angle of the rack 41 is decreased and the pitch of the rack 41 is changed upon turning of the rack shaft 33, thus changing a state of engagement, in which two teeth of the rack 41 and two teeth of the pinion 38 are engaged with each other as shown in FIG. 7A, to a state in which only one tooth of the rack 41 and only one tooth of the pinion 38 are engaged with each other as shown in FIG. 7B. Consequently, in the state shown in FIG. 7B, the tooth tip of the rack 41 is bitten into the tooth root side of the pinion 38.

Thus, in the case of using the rack 41 having conventional tooth profile in which the pressure angle is set constant from the tooth tip to the tooth end, upon rotation of the rack shaft 33 and change of the engagement relationship between the rack 41 and the pinion 38, stress concentration occurs at the tooth tip of the single tooth of the rack 41, which might give rise to tooth breakage, degradation in engagement accuracy, and so on.

Figure 8A:
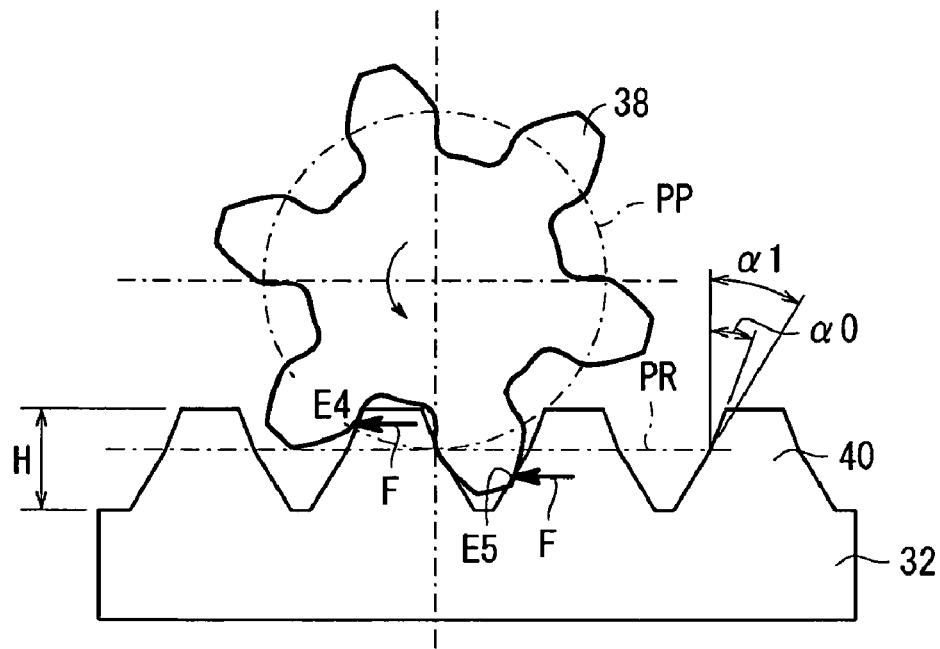
FIG. 8A is a cross-sectional view schematically showing a state of engagement between a rack having tooth profile according to the present embodiment and a pinion in normal times.

Next, a state of engagement between the rack 40 used in the electric power steering apparatus 10 according to the present embodiment and the pinion 38 will be described with reference to FIG. 8A and FIG. 8B. FIG. 8A is a cross-sectional view schematically showing a state of engagement between the rack 40 having tooth profile according to the present embodiment and the pinion 38 in normal times, and FIG. 8B is a cross-sectional view schematically showing a state of engagement between the rack 40 and the pinion 38, in which the rack shaft 32 has been rotated by the rotation angle θ from the state shown in FIG. 8A.

As shown in FIG. 8A, a portion of the rack 40 ranging from the vicinity of the pitch line PR to the tooth root is increased in pressure angle as compared with the rack 41 having conventional tooth profile shown in FIG. 7A and FIG. 7B. Specifically, from the tooth tip side of the rack 40 to the tooth root side thereof, the pressure angle is set so as to be increased from α0 to α1 (α0<α1). In other words, the rack 40 has at least two pressure angles α0 and α1, and the greater pressure angle α1 is set at the tooth root side of the rack 40.

Figure 8B:
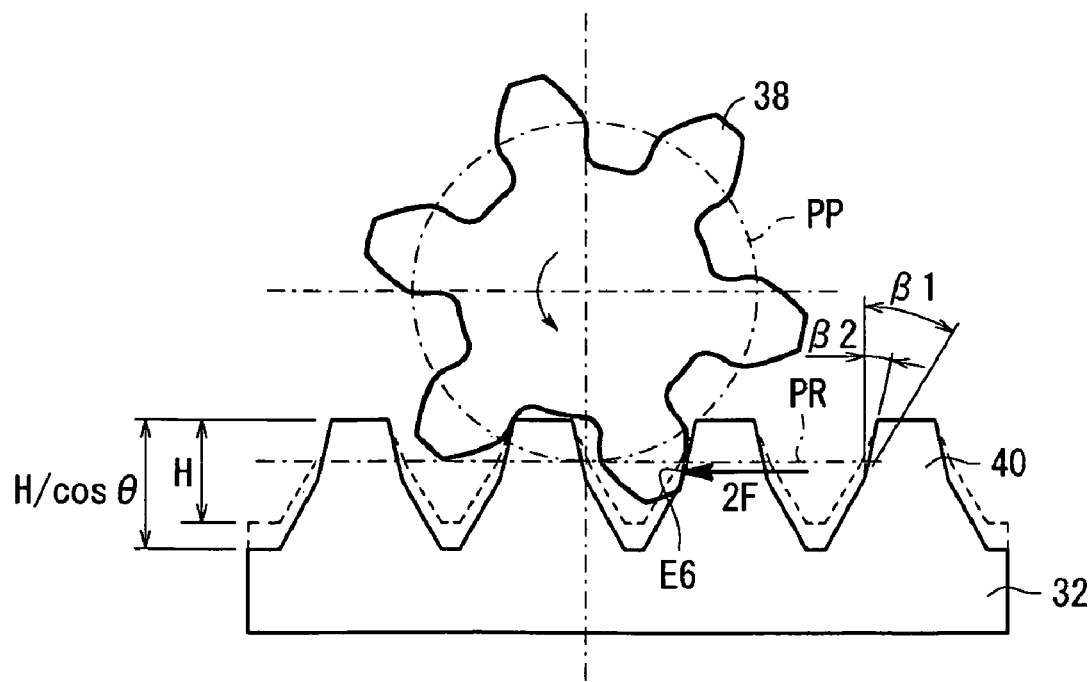
FIG. 8B is a cross-sectional view schematically showing a state of engagement between the rack and the pinion, in which a rack shaft has been rotated from the state shown in FIG. 8A.

Accordingly, as shown in FIG. 8B, upon rotation of the rack shaft 32 by the rotation angle θ, the tooth root side of the rack 40 abuts against the pinion 38 before the tooth tip side of the rack 40 abuts against the pinion 38 because a pressure angle β1 of the tooth root side of the rack 40 is set to be greater than a pressure angle β0 of the tooth tip side of the rack 40. Therefore, it is possible to prevent the problem caused in the rack 41 having the conventional tooth profile shown in FIG. 7B, in which the tooth tip of the rack 41 bites into the tooth root side of the pinion 38 and a load is concentratedly applied on the tip of the single tooth of the rack 41.

Specifically, as shown in FIG. 8A, prior to the rotation of the rack shaft 32, the rack 40 and the pinion 38 are engaged with each other at two engagement points E4 and E5, and the load F is applied on each of the engagement points E4 and E5. On the other hand, as shown in FIG. 8B, after the rotation of the rack shaft 32, the rack 40 and the pinion 38 are engaged with each other only at a single engagement point E6, and the load 2F, which is twice as large as the load F, is applied on the engagement point E6. However, in this case, the engagement point E6 is provided at the tooth root side of the rack 40 unlike the case shown in FIG. 7B.

As described above, in the present embodiment, upon rotation of the rack shaft 32, the burden of the load applied to the rack 40 is moved to the tooth root side thicker than the tooth tip side. More specifically, the pressure angle of the tooth root of the rack 40 is set to be greater than that of the tooth tip of the rack 40, thereby allowing the pinion 38 to abut against the tooth root side of the rack 40, which is thicker and stronger. As a result, the bending moment of the rack 40 can be reduced, thereby making it possible to improve the strength thereof, and to cope with a higher rack shaft force. Thus, the durability of the rack 40 serving as the gear constituting the rack-and-pinion mechanism 30, and the engagement accuracy of the rack 40 with respect to the pinion 38 can be maintained or improved, and the operation feeling of the electric power steering apparatus 10 can also be improved.

Figure 9A:
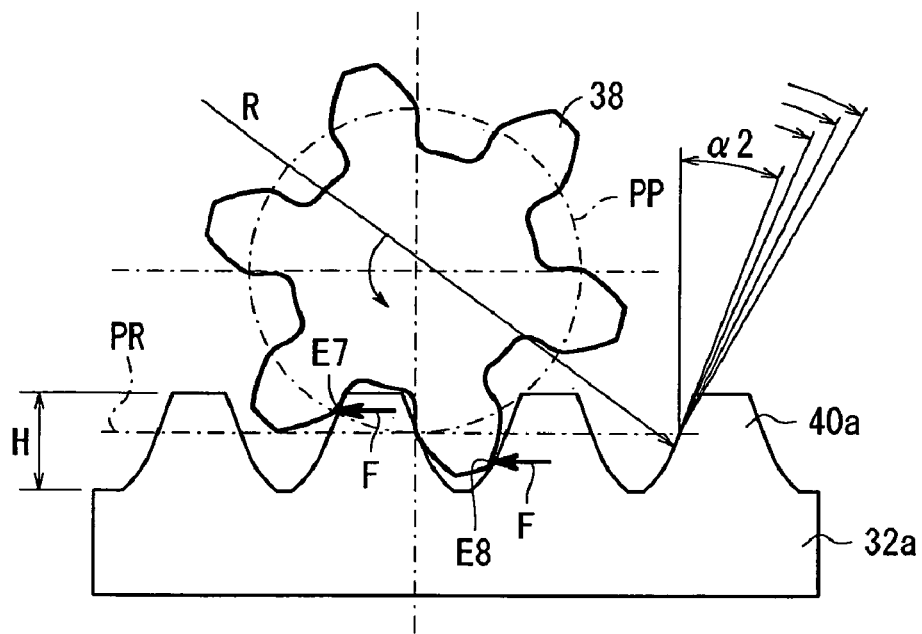
FIG. 9A is a cross-sectional view schematically showing a state of engagement between a rack having tooth profile according to a variation of the present embodiment and a pinion in normal times.
Figure 9B:
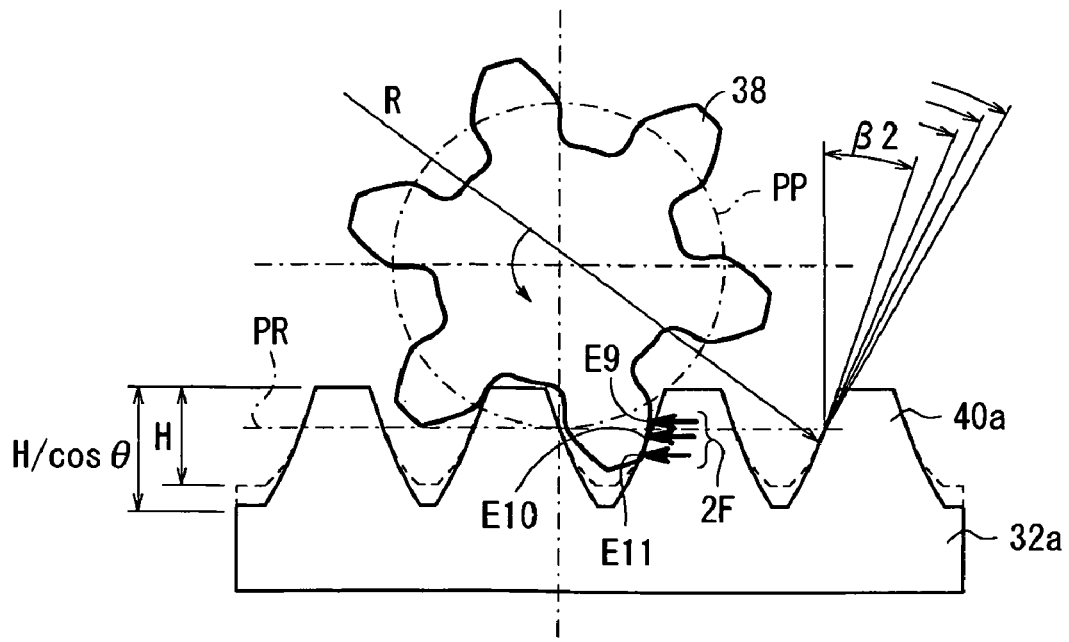
FIG. 9B is a cross-sectional view schematically showing a state of engagement between the rack and the pinion, in which a rack shaft has been rotated from the state shown in FIG. 9A.

It should be noted that in the rack-and-pinion mechanism 30 provided in the electric power steering apparatus 10 according to the present embodiment, a rack having tooth profile other than that shown in FIG. 8A and FIG. 8B described above may also be used, and it is essential only that the pressure angle of the tooth root side of the rack be greater than that of the tooth tip side of the rack. FIG. 9A is a cross-sectional view schematically showing a state of engagement between a rack 40a having tooth profile according to a variation of the present embodiment and the pinion 38 in normal times, and FIG. 9B is a cross-sectional view schematically showing a state of engagement between the rack 40a and the pinion 38, in which a rack shaft 32a has been rotated by the rotation angle θ from the state shown in FIG. 9A.

As shown in FIG. 9A, the rack 40a is set to have an approximate arc shape including a diameter R so that a pressure angle α2 is gradually increased from the vicinity of the pitch line PR to the tooth root. In this case, the rack 40a is formed into an approximate arc shape so that the pressure angle α2 of the tooth root side of the rack 40a is gradually increased from the pressure angle of the tooth tip (tooth end). Thus, as shown in FIG. 9B, upon rotation of the rack shaft 32a, a pressure angle β2 of the rack 40a is also gradually increased from the tooth tip to the tooth root.

Accordingly, as shown in FIG. 9A, prior to the rotation of the rack 32a, the rack 40a and the pinion 38 are engaged with each other at two engagement points E7 and E8, and the load F is applied on each of the engagement points E7 and E8. When the rack shaft 32a is rotated from this state as shown in FIG. 9B in which the single tooth of the rack 40a is engaged with the single tooth of the pinion 38, the tooth root of the rack 40a and the tooth tip of the pinion 38 abut against each other at a plurality of engagement points E9 to E11 via arc-shaped surfaces.

In this embodiment, since the pressure angle β2 of the tooth root of the rack 40a is set to be large similarly to the tooth tip of the pinion 38, the tooth tip of the rack 40a is prevented from biting into the tooth root side of the pinion 38, and the tooth tip of the rack 40a and the tooth root of the pinion 38 are prevented from strongly abutting against each other. Thus, breakage due to the increase in the bending moment of the rack 40a and/or increase in surface pressure of the tooth tip portion of the rack 40a are/is suppressed. Furthermore, the concave arc-shaped tooth root of the rack 40a is brought into contact with the convex arc-shaped tooth tip of the pinion 38, thereby making it possible to effectively reduce the surface pressure applied to the contact portion. Besides, since the arc-shaped tooth root of the rack 40a and the arc-shaped tooth tip of the pinion 38 are brought into contact with each other at the contact portion as described above, and are thus brought into contact with each other at a plurality of the engagement points E9 to E11, the load applied thereto becomes distributed loads that are not applied to a single point but are applied to a slightly wide range in a distributed manner, and a total of all the distributed loads becomes the load 2F.

Furthermore, in this case, due to the effects of the above-described distributed loads and the like, not only the bending moment of the rack 40a but also the bending moment of the tooth root of the pinion 38 can be reduced, and the bending stress applied to the tooth roots of the rack 40a and the pinion 38 can be reduced, i.e., the bending strength of the rack 40a and the pinion 38 can be improved.

It should be noted that in the rack 40a described above, the diameter R of the pressure angle α2 (β2), of course, does not have to be formed by a singular arc shape, but may naturally be provided by an arc shape or the like formed by a set of a plurality of straight lines.

As described above, according to the foregoing embodiment, the pressure angle of the tooth root of the rack 40 (40a) is set to be greater than that of the tooth tip thereof, thereby effectively preventing the rack 40 (40a) from biting into the tooth root side of the pinion 38 at the time of rotation of the rack shaft 32 (32a), and allowing the tooth root side of the rack 40 (40a) to abut against the pinion 38 before the tooth tip side of the rack 40 (40a) abut against the pinion 38 (see FIG. 8B and FIG. 9B). Thus, the concentrated application of a load to the tip of the single tooth, which has occurred in the rack 41 having conventional tooth profile shown in FIG. 7B, is prevented. In other words, when the rack shaft 32 (32a) is rotated, the burden of the load can be moved to the tooth root side thicker than the tooth tip side. Accordingly, the pinion 38 is allowed to abut against the tooth root side of the rack 40 (40a), which is thicker and stronger, and the bending moment of the rack 40 (40a) can be reduced. Therefore, the durability of the rack-and-pinion mechanism 30 and the accuracy of engagement of the rack 40 (40a) with the pinion 38 can be maintained and improved, and the operation feeling of the electric power steering apparatus 10 can be improved.

The present invention has been described based on the foregoing embodiment thus far, but the present invention is not limited to this embodiment. For example, the present invention is applicable not only to helical gears but also to straight gears and the like, and various structures can naturally be adopted without departing from the scope of the present invention.

Further, although the electric power steering apparatus that uses the assist mechanism has been described as an example, the above-described rack-and-pinion mechanism may also be provided in a steering apparatus that uses no assist mechanism, thus making it possible to suppress deviation of engagement between a rack and a pinion.

Next, a preferred embodiment of the foregoing reduction mechanism 48 will be described in detail. It should be noted that the reduction mechanism 48 described below may be used in combination with the foregoing rack-and-pinion mechanism, and the above-described effects of the rack-and-pinion mechanism according to the present invention can be achieved even if a commonly used reduction mechanism 48 is combined with the foregoing rack-and-pinion mechanism. However, an electric power steering apparatus, in which the reduction mechanism 48 described hereinafter is combined with the foregoing rack-and-pinion mechanism 30, prevents a transmission torque transmitted via a steering system from being lost along the way, and makes it possible to obtain a good operation feeling.

First, a conventional reduction mechanism will be described.

Figure 18:
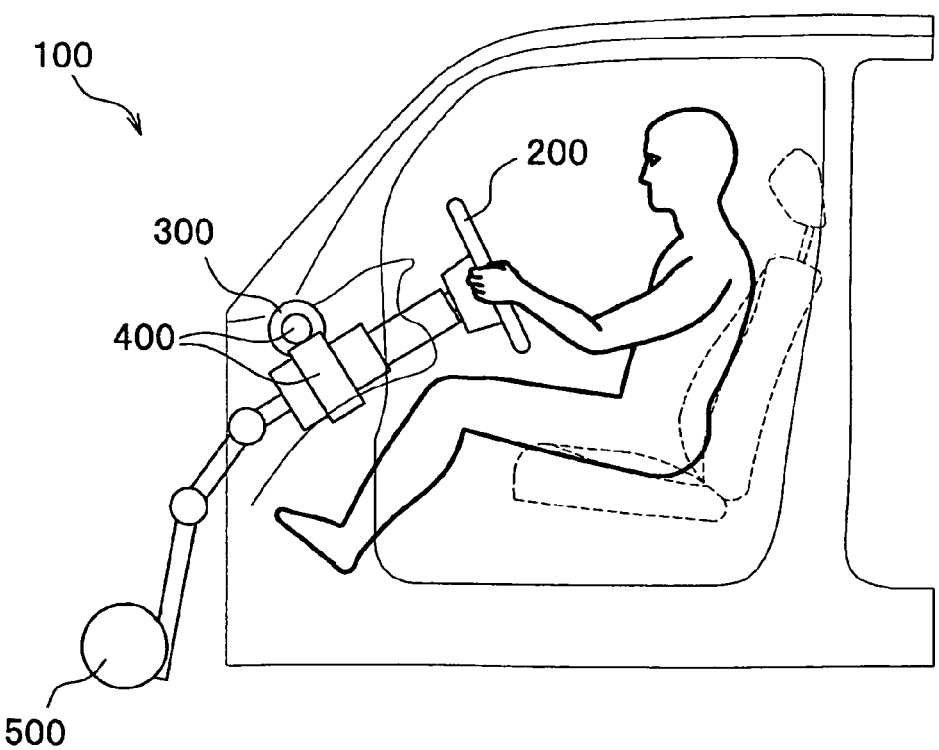
FIG. 18 is a schematic diagram showing an installed state of a conventional electric power steering apparatus.

FIG. 18 is a schematic diagram showing a conventional electric power steering apparatus.

As shown in FIG. 18, as a power steering apparatus for alleviating a steering force of a steering wheel 200, an electric power steering apparatus 100 having electric motors 300, 300 as power sources has conventionally been used (see the JP-A-2005-199776, for example). In general, the electric power steering apparatus 100 assists the rotation torque of the electric motor 300 by a reduction mechanism 400 to supply the assisted rotation torque to a rack shaft 500 via a rack-and-pinion mechanism, thereby providing assistance to a steering operation performed by a driver.

Figure 19:
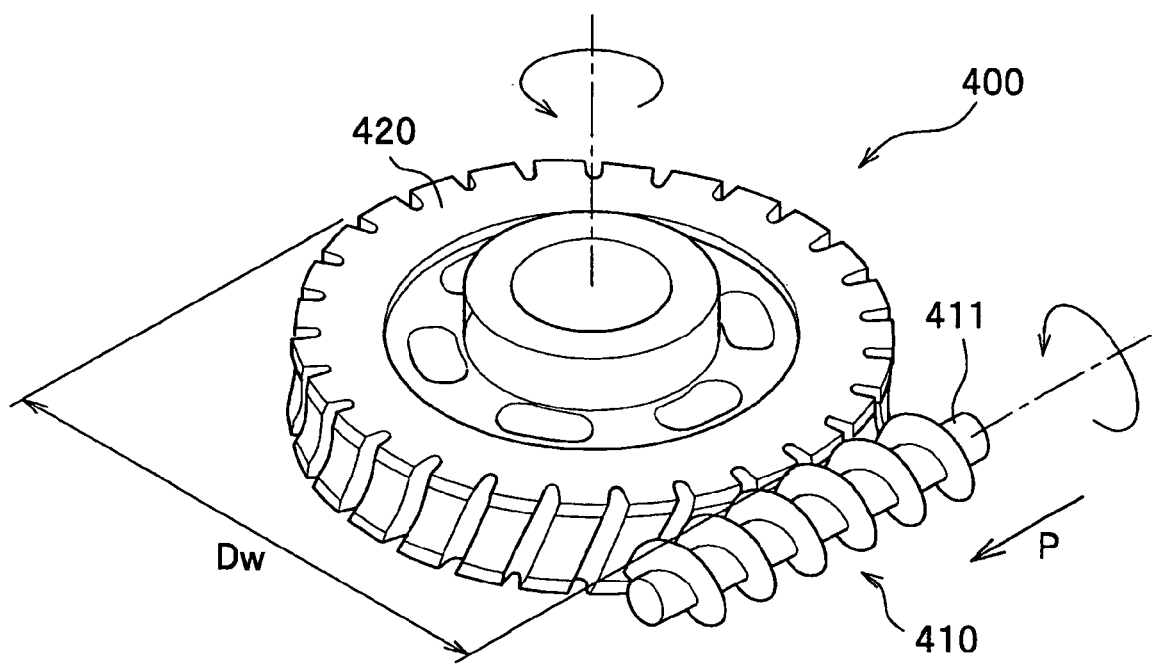
FIG. 19 is a perspective view showing a reduction mechanism installed on a conventional electric power steering apparatus.

FIG. 19 is a perspective view showing the reduction mechanism of the conventional electric power steering apparatus. As shown in FIG. 19, the conventional reduction mechanism 400 includes: a worm gear 410 disposed on a rotor shaft of the electric motor 300 (see FIG. 18); and a worm wheel 420.

In recent years, with the widespread use of the electric power steering apparatus 100 shown in FIG. 18, the demand for installation of the electric power steering apparatus 100 on a large vehicle has been growing. However, in a large vehicle, a large front axle load is applied, and therefore, there have been problems that the electric motor 300 must be increased in size to increase a generated torque in order to cope with the large front axle load, and that the strength of the reduction mechanism 400 must also be increased in accordance with the increase in the torque of the electric motor 300.

In order to increase the strength of the reduction mechanism 400 and the bending rigidity of the worm gear 410, there have been problems that an outside diameter Dw of the worm wheel 420 and an outside diameter of a rotation shaft 411 of the worm gear 410 shown in FIG. 19 must be increased, and a transmission torque must be increased while a tangential load P that can be withstood by this worm wheel 420 is maintained.

However, if the reduction mechanism 48 is increased in size, there have been problems that a space located adjacent to a knee of a driver and/or a space located around a foot of the driver are/is reduced by the reduction mechanism 48, and a cabin of the driver is reduced as shown in FIG. 18. Hence, it is desired that the size of the reduction mechanism 48 is reduced so as to reduce the size of the entire electric power steering apparatus 100.

Therefore, the reduction mechanism according to the embodiment of the present invention described below makes it possible to increase the tangential load that can be withstood by the worm wheel, and the transmission torque while keeping the outside diameter of the worm wheel unchanged.

Figure 11:
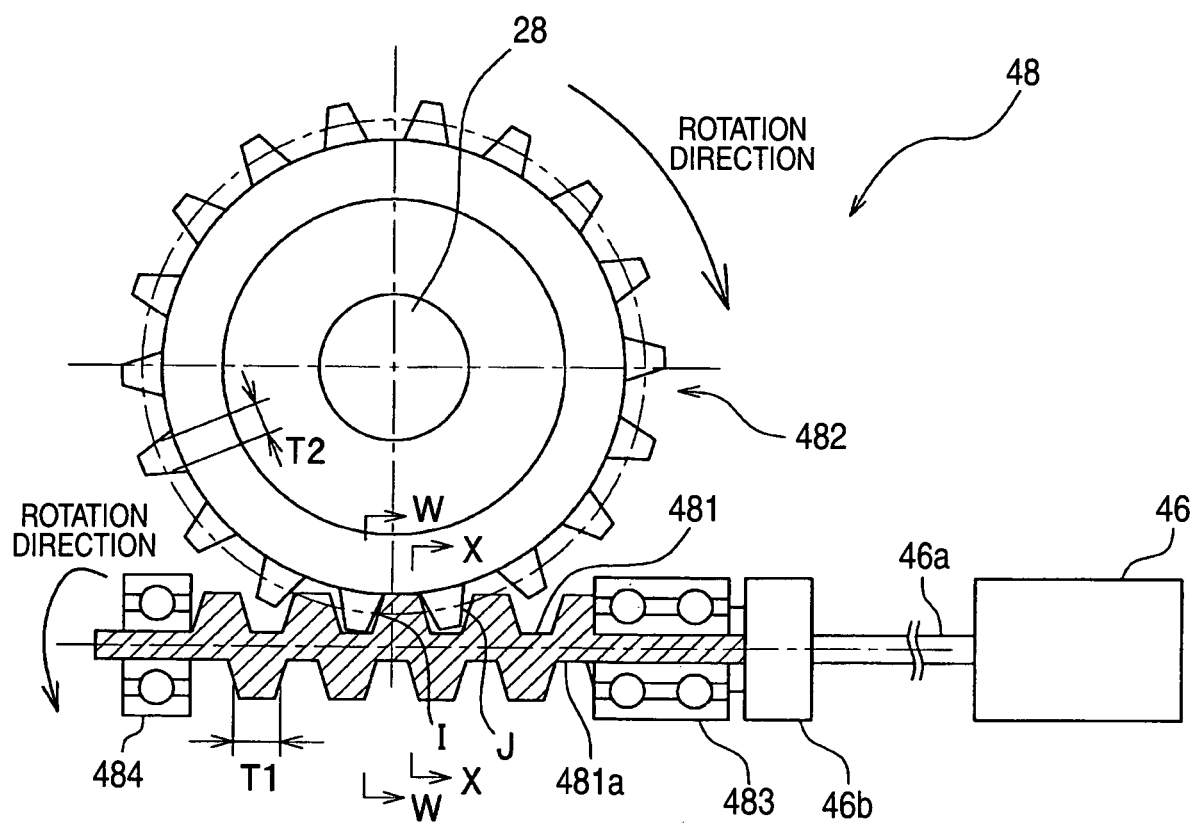
FIG. 11 is a schematic diagram showing a reduction mechanism of the electric power steering apparatus according to the embodiment of the present invention.

As shown in FIG. 11, a rotor shaft 46a rotated together with a rotor of an electric motor 46 is connected with a worm gear shaft 481a via a coupling 46b formed by an elastic body such as rubber, serration, etc., so that the rotation and torque of the electric motor 46 is transmitted to a worm gear 481 having a single thread tooth trace.

The reduction mechanism 48 shown in FIG. 11 has the functions of increasing the rotation torque of the electric motor 46 and transmitting the increased rotation torque to a steering shaft 28, and consists of a reduction gear mechanism. For example, this reduction mechanism 48 is formed by engaging the single thread worm gear 481, which is connected to the rotor shaft (output shaft) 46a of the electric motor 46 and rotated therewith, with a worm wheel 482 provided at the steering shaft 28.

<Structure of Worm Gear>

As shown in FIG. 11, the worm gear 481 includes a screw having a single thread tooth trace formed integrally with the worm gear shaft 481a connected to the rotor shaft 46a, and the worm gear 481 is pivotally supported so as to be rotatable via bearings 483, 484 disposed at both ends of this worm gear shaft 481a. The worm gear 481 is further preferably formed so that a tooth thickness T1 thereof is greater than a tooth thickness T2 of the worm wheel 482.

Figure 12A:
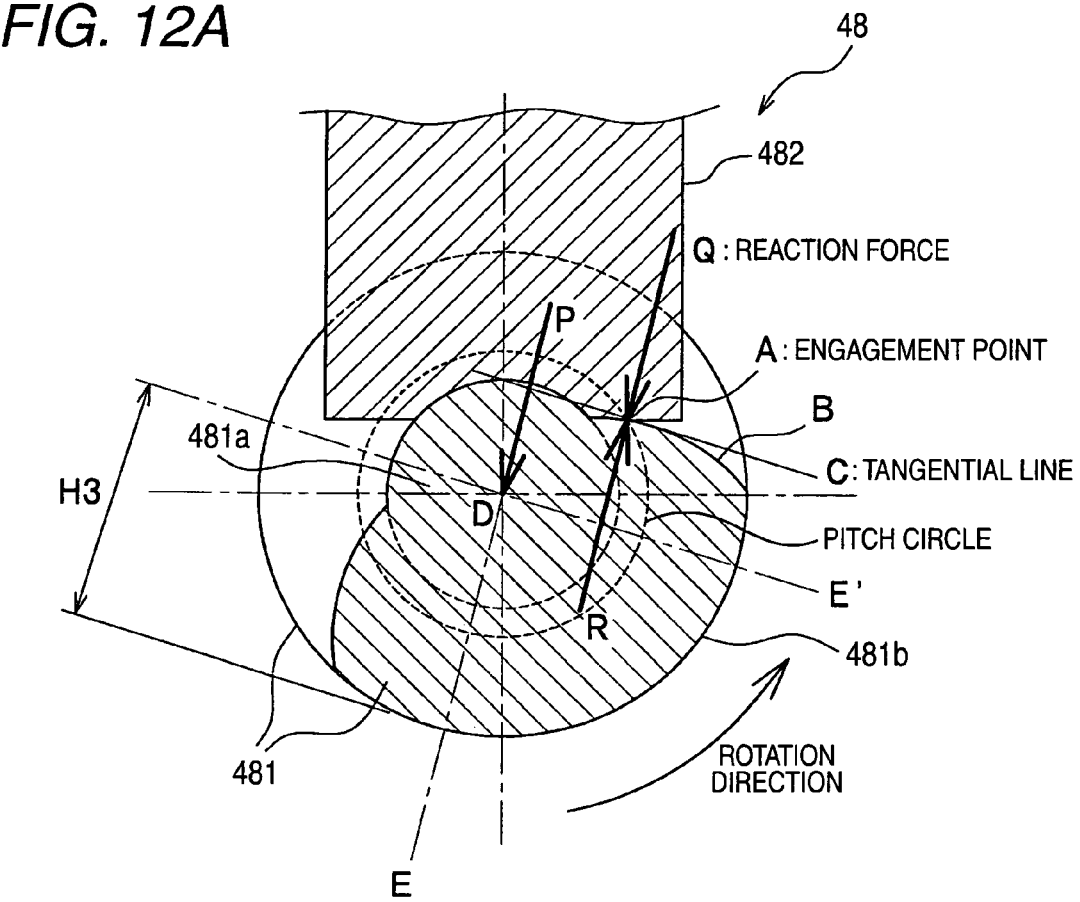
FIG. 12A is an enlarged cross-sectional view taken along the line W-W of FIG. 11 to show a state of engagement between a single thread worm gear and a worm wheel in the electric power steering apparatus according to the embodiment of the present invention.

As shown in FIG. 12A, the worm gear 481 is formed as follows.

A plane orthogonal to a longitudinal axial direction of the worm gear 481 is defined as W, a tangent line of an engagement point A between the worm gear 481 and the worm wheel 482, which appears in a cross section W-W of the worm gear along the plane W, is defined as C, and a rotation center of the worm gear 481 is defined as D. Further, a straight line, which passes through the rotation center D of the worm gear 481, which is parallel to a straight line perpendicular to the tangent line C, and which is located on the plane W, is defined as E. In this case, the straight line E intersects a tooth periphery 481b of the worm gear on the plane W.

Specifically, the worm gear 481 is formed so that the straight line E and the tooth periphery 481b of the worm gear 481 intersect with each other at a position radially opposite to the worm engagement point A with the worm gear shaft (rotation shaft) 481a interposed therebetween.

Figure 12B:
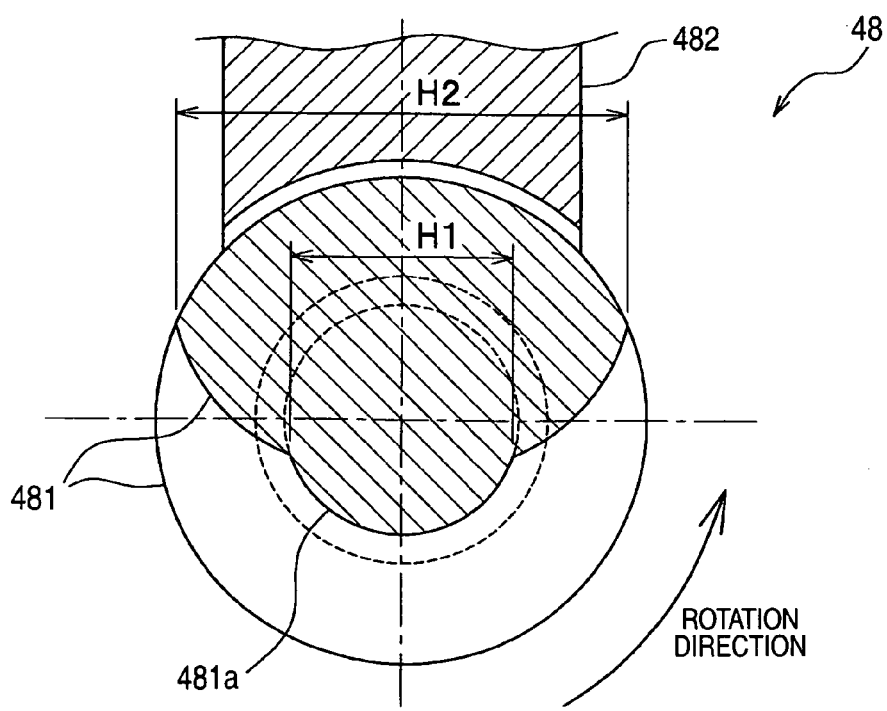
FIG. 12B is an enlarged cross-sectional view taken along the line X-X of FIG. 11 to show a state of engagement between the single thread worm gear and the worm wheel in the electric power steering apparatus according to the embodiment of the present invention.

It should be noted that in FIG. 12A and FIG. 12B, a round portion R that is normally provided at a tooth tip is not shown.

No round portion R is shown in the example of FIG. 12A and FIG. 12B, but in the case of providing the round portion R, the worm gear may be designed so that settings are made to allow the straight line E to intersect the tooth tip periphery 481b as described above in a structure in which no round portion R is virtually provided, and the round portion R is provided thereafter. This is because, with such a design, even if a plurality of worm gears having different shapes are designed with the curvature of the round portion R variously changed, the diagrams such as FIGS. 12A and 12B serve as the standards for dimensional control of the worm gears, thereby making it possible to improve the dimensional accuracy.

<Structure of Worm Wheel>

Figure 10:
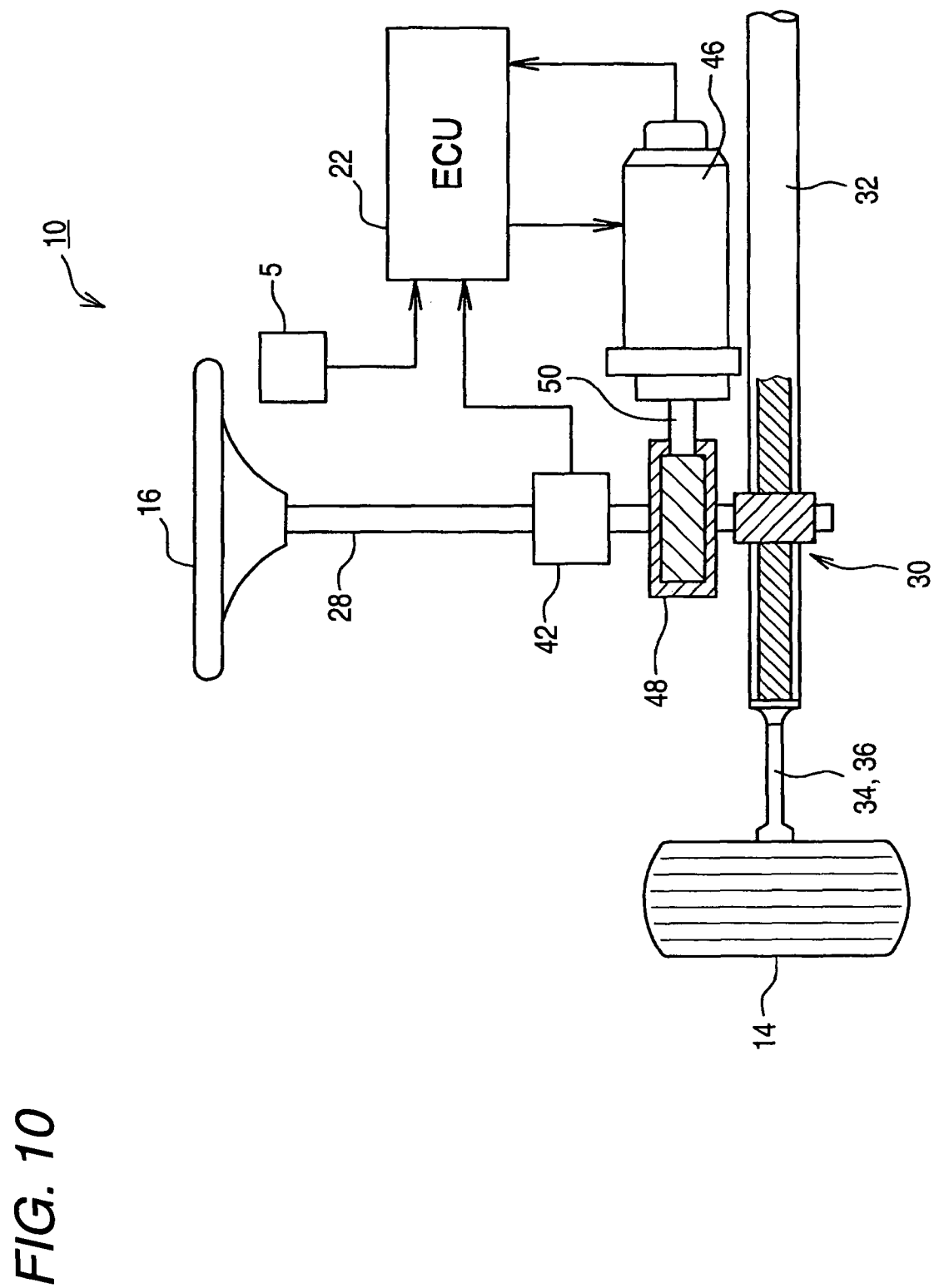
FIG. 10 is a schematic diagram showing a structure of an electric power steering apparatus according to an embodiment of the present embodiment.

In a so-called column type electric power steering apparatus 10 as shown in FIG. 10, the worm wheel 482 is provided integrally with the steering shaft 28, and in the pinion type electric power steering apparatus 100 as shown in FIG. 18, the worm wheel 482 is provided integrally with the pinion shaft. The worm wheel 482 is provided in either of these electric power steering apparatuses.

As shown in FIG. 11, the worm gear 481 is formed so that the tooth thickness T1 thereof is greater than a tooth thickness t1 of a worm gear 4810 (see FIG. 14) of a comparative example described later. Thus, conversely, the worm wheel 482 is formed so that a tooth thickness T2 thereof is accordingly thinner than a tooth thickness t2 of the comparative example.

The bearings 483, 484 are formed by ball bearings, inner rings of which are disposed so as to be rotated together with the worm gear shaft 481a, and outer rings of which are inserted into an inner wall of a gear housing (not shown).

<Operation>

Next, operations of the reduction mechanism 48 of the electric power steering apparatus 10 according to the embodiment of the present invention will be described by making a comparison with those of a reduction mechanism 4800 of the comparative example shown in FIG. 14.

Figure 13:
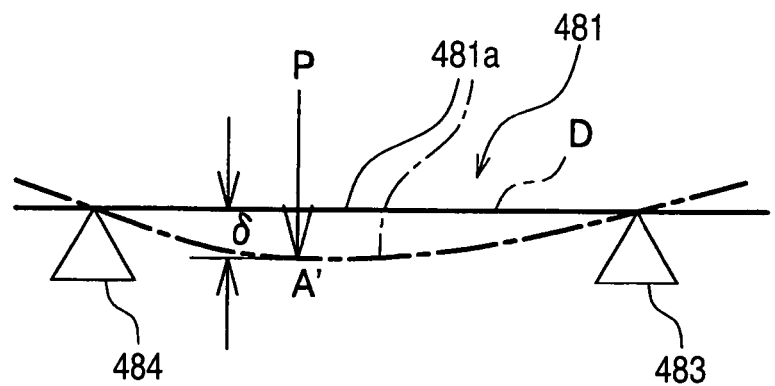
FIG. 13 is an explanatory diagram showing a deflection curve when the single thread worm gear in the electric power steering apparatus according to the embodiment of the present invention is regarded as a single beam.

FIG. 13 is an explanatory diagram showing a deflection curve when the worm gear in the electric power steering apparatus according to the embodiment of the present invention is regarded as a single beam. FIG. 14 is a schematic diagram showing the comparative example of the reduction mechanism of an electric power steering apparatus. FIG. 15A is an enlarged cross-sectional view taken along the line Y-Y of FIG. 14, and FIG. 15B is an enlarged cross-sectional view taken along the line Z-Z of FIG. 14.

First, the reduction mechanism 4800 of the comparative example will be described.

Figure 14:
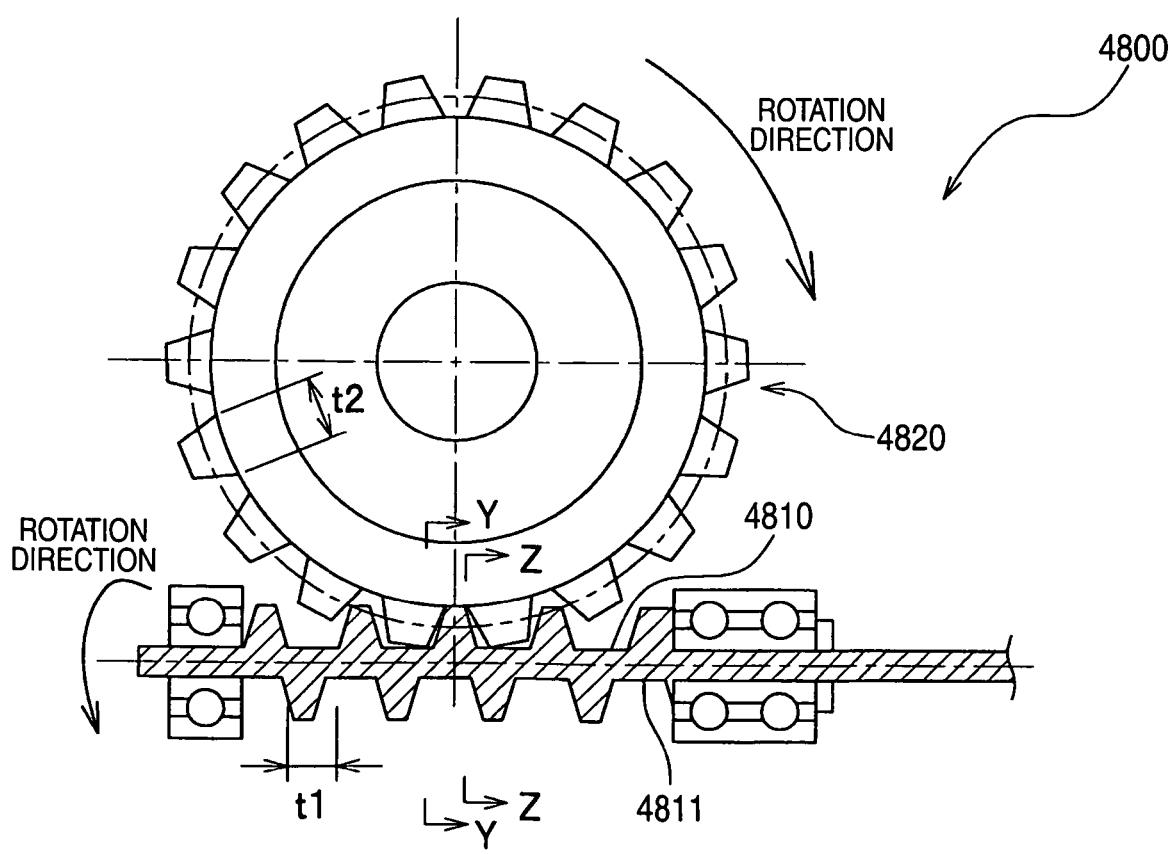
FIG. 14 is a schematic diagram showing a comparative example of a reduction mechanism of an electric power steering apparatus.
Figure 15A:
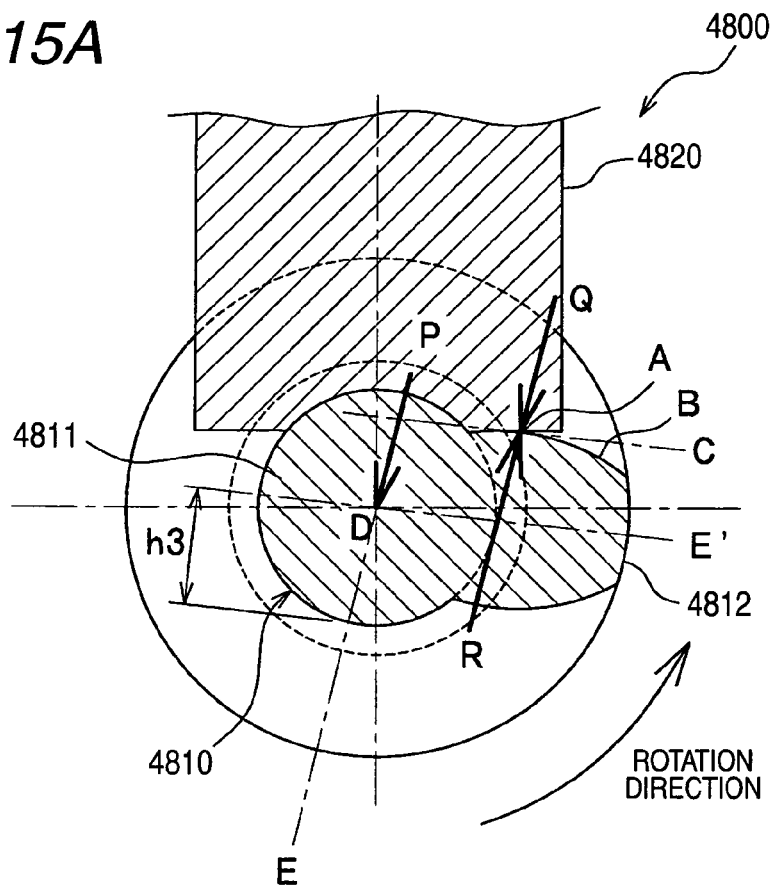
FIG. 15A is an enlarged cross-sectional view taken along the line Y-Y of FIG. 14.
Figure 15B:
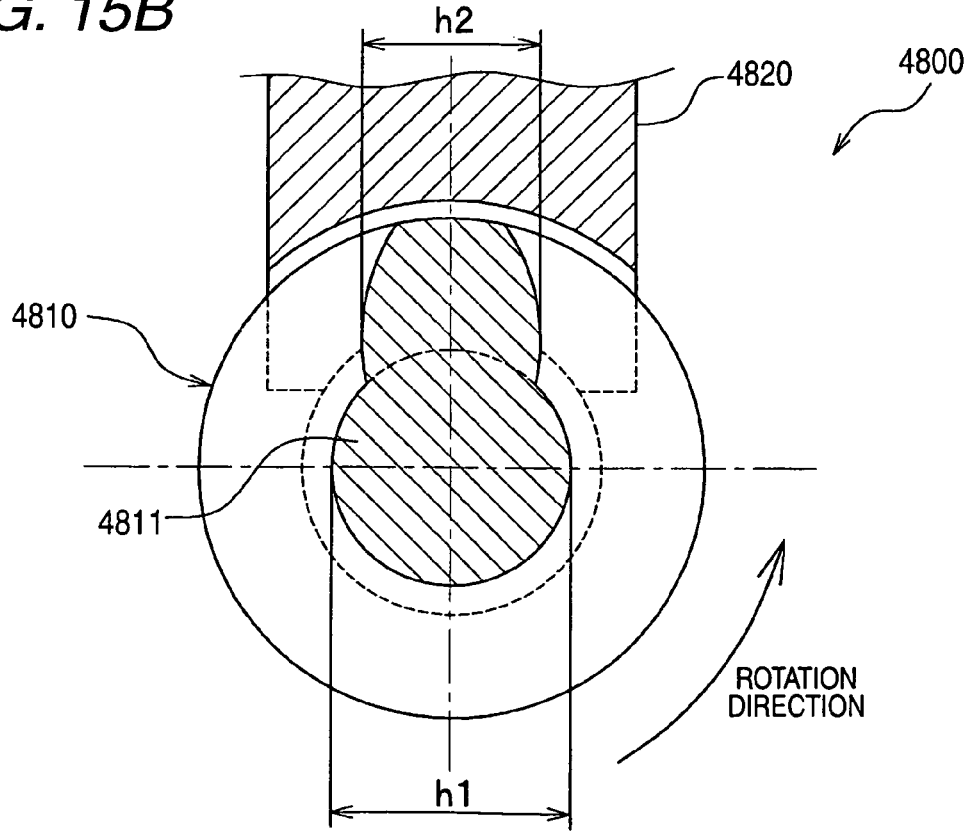
FIG. 15B is an enlarged cross-sectional view taken along the line Z-Z of FIG. 14.

In the reduction mechanism 4800 of the comparative example, shown in FIG. 14 and FIGS. 15A and 15B and provided in a commonly used electric power steering apparatus, a reduction ratio is about 20, and this reduction ratio is established by a worm wheel 4820 having a diameter of about 100 mm. Therefore, a worm gear shaft 4811 of the worm gear 4810 is formed to have a diameter of 10 mm or less. In the reduction mechanism 4800 formed in this manner, when a torque applied to the worm wheel 4820 is large, the worm gear shaft 4811 causes deflection to deviate from an engagement pitch line, and the engagement state of the worm gear 4810 and the worm wheel 4820 cannot be maintained. The load applied at this time is an allowable load. Specifically, if the engagement state cannot be maintained, an engagement position exceeds a pitch circle of the worm wheel 4820, and a bending moment applied to a tooth is increased. Therefore, the load applied at this time is an allowable load.

As shown in FIG. 15A, the tooth profile of the worm gear 4810 of the comparative example is formed so that a straight line E, passing through a rotation center D of the worm gear 4810 in the direction perpendicular to the axis with respect to a tangent line C of a worm engagement point A between the worm gear 4810 and the worm wheel 4820, does not intersect a periphery 4812 located more radially than the worm gear shaft 4811 of the worm gear 4810. In the worm gear 4810 of the comparative example formed in this manner, in a cross section Y-Y in the direction perpendicular to the axis, the length ranging downward from a straight line E' passing through the rotation center D and parallel to the tangent line C is denoted by h3 and is short. Furthermore, as shown in FIG. 15B, the worm gear 4810 of the comparative example is formed so that a width h2 of a cross section Z-Z in the direction perpendicular to the axis is small and shorter than an outside diameter h1 of the worm gear shaft 4811, and the structure of the worm gear 4810 thus has a relatively low rigidity. In other words, the rigidity of the structure of the worm gear 4810 according to the comparative example is too poor or too low to support a large load R.

In the cross section Y-Y in the direction perpendicular to the axis, when the tangential load R acting on the worm wheel 4820 in the direction perpendicular to the tangent line C of the worm engagement point A on a tooth portion starting curve B, and a reaction force Q of this tangential load R are applied to the worm gear 4810, a tangential load P (tangential load P=reaction force Q) is applied to the rotation center D of the worm gear 4810. If a transmission torque is increased, this tangential load P is increased. In order to withstand the increase in the tangential load P, the outside diameter of the worm wheel 4820 is increased in the reduction mechanism 4800 of the comparative example, and therefore, the size of the entire worm wheel 4820 is increased.

Next, the reduction mechanism 48 according to the present invention will be described.

FIG. 12A is a cross-sectional view taken along the direction perpendicular to the axis, and shows the state in which the worm gear 481 of the present invention starts engaging with the worm wheel 482.

As shown in FIG. 12A, the cross-sectional shape (cross section W-W) in the direction perpendicular to the axis of the worm gear 481 is formed to have an involute tooth profile. In the cross section W-W in the direction perpendicular to the axis, the tooth profile of the worm gear 481 is formed so that the straight line E, passing through the rotation center D of the worm gear 481 in the direction perpendicular to the axis with respect to the tangent line C of the worm engagement point A between the worm gear 481 and the worm wheel 482 on the tooth portion starting curve B, intersects the tooth periphery 481b of the worm gear 481. The tooth profile of the worm gear 481 is formed so that the straight line E and the tooth periphery 481b of the worm gear 481 intersect with each other at a position opposite to the worm engagement point A with the worm gear shaft (rotation shaft) 481a interposed therebetween, and therefore, the cross section of teeth in the direction perpendicular to the axis is formed into an approximate fan shape.

Since the worm gear 481 formed in this manner, the cross-sectional area ranging downward from the straight line E', parallel to the tangent line C and passing through the rotation center D in the cross section W-W taken along the direction perpendicular to the axis, is considerably increased and widened as compared with the above-described comparative example. In particular, a length H3 from the rotation center D to the tooth periphery 481b of the worm gear 481 is considerably long.

As shown in FIG. 12A, during rotation of the worm gear 481 and rotation of the worm wheel 482 engaged therewith, in the cross section W-W taken along the direction perpendicular to the axis, the tangential load R acting on the worm wheel 482 in the direction perpendicular to the tangent line C of the worm engagement point A on the tooth portion starting curve B, and the reaction force Q of this tangential load R are applied to the worm gear 481. At this time, the tangential load P (tangential load P=reaction force Q) is applied to the rotation center D of the worm gear 481.

The worm gear 481 is formed so that the tooth thickness T1 (see FIG. 11) is more than twice the tooth thickness t1 of the worm gear 4810 of the comparative example (see FIG. 14). Further, the worm gear 481 is formed so that the tooth thickness T1 thereof is thicker than the tooth thickness T2 of the worm wheel 482.

Furthermore, the cross-sectional area of the cross section W-W of the worm gear 481 is considerably increased as compared with the cross-sectional area of the worm gear 4810 of the comparative example (see FIG. 14).

Moreover, the worm gear 481 is formed so that, in the cross section W-W taken along the direction perpendicular to the axis, a width H2 of the cross section W-W in the direction perpendicular to the axis is considerably greater than an outside diameter H1 of the worm gear shaft 481a. In particular, the worm gear 481 is formed so that the width H2 of the cross section W-W in the direction perpendicular to the axis is considerably greater than the width h2 of the cross section Z-Z in the direction perpendicular to the axis according to the comparative example, and furthermore, the cross-sectional area in the direction perpendicular to the axis is wider and the tooth thickness T1 is thicker as compared with the comparative example.

Thus, a deflection δ due to the tangential load P shown in FIG. 13 can be considerably reduced as compared with the comparative example. As a result, the engagement position deviation can be reduced, and the allowable load of the worm gear 481 can be considerably increased. More specifically, when the large tangential load R is applied to the worm gear 481, this tangential load R is supported by a wide hatched tooth portion of the worm gear 481 shown in FIG. 12A. Therefore, the rigidity against the tangential load R is significantly enhanced, thereby making it possible to considerably reduce the deflection δ. Consequently, the allowable load can be considerably increased.

For example, if the width H3 of the cross section W-W taken along the direction perpendicular to the axis of the worm gear 481 is 24 mm and the width h3 of the cross section Z-Z taken along the direction perpendicular to the axis according to the comparative example is 12 mm, the deflection δ due to the tangential load P (see FIG. 13) can be reduced to about ⅛ as compared with the comparative example, and the allowable load can be about eight times as large as that of the comparative example.

Moreover, since the worm gear 481 is formed so that the tooth thickness T1 (see FIG. 11) is more than twice the tooth thickness t1 of the comparative example (see FIG. 14), the worm gear 481 is increased in mass. Therefore, heat generation due to the engagement between the worm gear 481 and the worm wheel 482 can be suppressed by so-called "mass effect" of the gear itself. Since the tooth thickness of the worm gear 481 can be further increased, the pitch can be reduced, i.e., the reduction ratio can be increased.

It should be noted that if the worm wheel 482 is made by resin, creep caused by heat generation and load can be suppressed, and hammering sound of the electric power steering apparatus 10 caused by the increase in backlash can be suppressed, thereby making it possible to enhance the marketability.

Since the reduction mechanism 48 is formed as described above, strength, bending rigidity and creep resistance can be increased by changing the tooth profile of the worm gear 481 even if the outside diameter of the worm wheel 482 is not increased and kept unchanged. In other words, the tangential load P that can be withstood by the worm gear 481 engaging with the worm wheel 482 can be considerably increased.

Thus, it is unnecessary to increase the size of the reduction mechanism 48 even if the electric power steering apparatus 10 is installed on a large vehicle having a large front axle load, and the reduction mechanism 48 of the electric power steering apparatus 10 can be reduced in size. As a result, even if the electric power steering apparatus 10 is installed on a large vehicle, the cabin of a driver will not be reduced.

<Variation>

It should be noted that the present invention is not limited to the foregoing embodiment, but various modifications and changes can be made to the present invention within the technical idea thereof, and therefore, the present invention naturally includes these modified and changed inventions.

Figure 16:
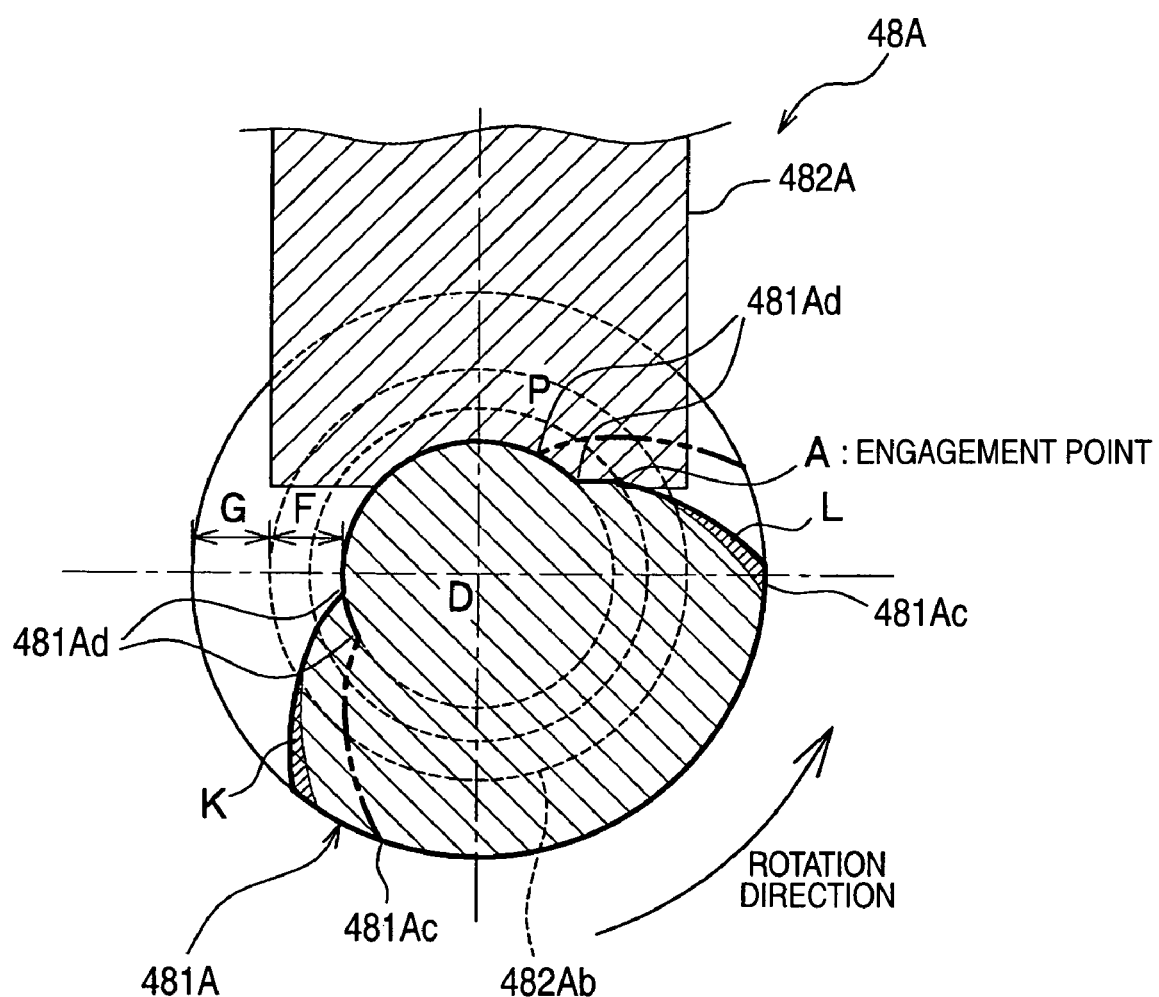
FIG. 16 is a schematic cross-sectional view showing a variation of the electric power steering apparatus according to the embodiment of the present invention, in which a principal portion thereof is enlarged to show a state of engagement between a single thread worm gear and a worm wheel.

FIG. 16 is a schematic cross-sectional view showing a variation of the electric power steering apparatus according to the embodiment of the present invention, in which a principal portion thereof is enlarged to show a state of engagement between a single thread worm gear and a worm wheel.

As shown in FIG. 16, in a cross section W-W taken along the direction perpendicular to the axis of a worm gear 481A of a reduction mechanism 48A, a range G from a tooth tip 481Ac to a pitch circle 481Ab is formed into an approximate arc shape, and a range F from a tooth root 481Ad to the pitch circle 481Ab is formed into an involute tooth surface including an involute curve.

Since the worm gear 481A is formed in this manner, at a position I (see FIG. 11) at which the engagement of the worm gear 481A with the worm wheel 482A starts, the interference of a subsequent tooth J (see FIG. 11) can be suppressed, and the worm gear 481A and the worm wheel 482A can be engaged with each other only at the worm engagement point A.

When the worm gear 481A and the worm wheel 482A are engaged with each other and both of the worm gear 481A and the worm wheel 482A are rotated, the engaged tooth of the worm wheel 482A is elastically deformed. With this elastic deformation of the worm wheel 482A, a region L might be brought into contact with the worm wheel 482A if the tooth of the worm gear 481A is formed by only an involute curve used in a common worm gear. Detailed description will be made about this below.

Originally, if the worm gear 481A or the worm wheel 482A is not elastically deformed, the worm gear 481A and the worm wheel 482A are brought into contact with each other only at the worm engagement point A. However, the tooth tip of the worm wheel 482A is elastically deformed in the rotation direction of the worm wheel (which is perpendicular to the plane of FIG. 16 and toward the front). Therefore, the tooth of the worm gear 481A (i.e., the region L at the time of rotation in the forward direction, or a region K at the time of rotation in the reverse direction), originally due to be brought into contact with the worm wheel 482A when the worm gear 481A and the worm wheel 482A are further rotated from the state shown in FIG. 16, might be brought into contact with the elastically deformed tooth tip of the worm wheel 482A.

Hence, in addition to the original tangential load P, the load resulting from the above-described elastic deformation might be applied to the worm gear 481A, and the deflection δ of the worm gear 481A might be increased. Since contact points are further increased, frictional heat generated at these contact points might be increased.

However, in the worm gear 481A of the present invention shown in FIG. 16, the tooth thickness is large as described above, and the cross-sectional area in the direction perpendicular to the axis is large. Therefore, the worm gear shaft substantially causes no deflection even if the tangential load and/or the load resulting from the above-mentioned elastic deformation are/is applied thereto.

Moreover, the tooth of the worm gear 481A according to the present invention shown in FIG. 16 is formed by the involute curve at a region ranging from the tooth root to the pitch circle, and is formed into an arc shape at a region ranging from the pitch circle to the tooth tip. Therefore, unlike the worm gear whose tooth is formed by only an involute curve, no tooth is formed at the hatched regions K and L in FIG. 16. Accordingly, even if the tooth tip of the worm wheel 482A is elastically deformed as described above, the elastically deformed tooth tip of the worm wheel 482A will not be brought into contact with the tooth of the worm gear 481A.

Hence, the worm gear 481A can be brought into contact with the worm wheel 482A only at the worm engagement point A, and only the tangential load P is applied to the worm gear 481A. Therefore, the allowable load of the reduction mechanism 48A can be set at a high level. Accordingly, the electric power steering apparatus 10 can be reduced in size.

Furthermore, if the worm wheel 482A is made by resin, creep caused by heat generation and load can be suppressed, and performance enhancement can be expected; in addition, hammering sound of the electric power steering apparatus 10 due to the increase in backlash can also be suppressed, thereby improving quietness.

<Another Variation>

Figure 17:
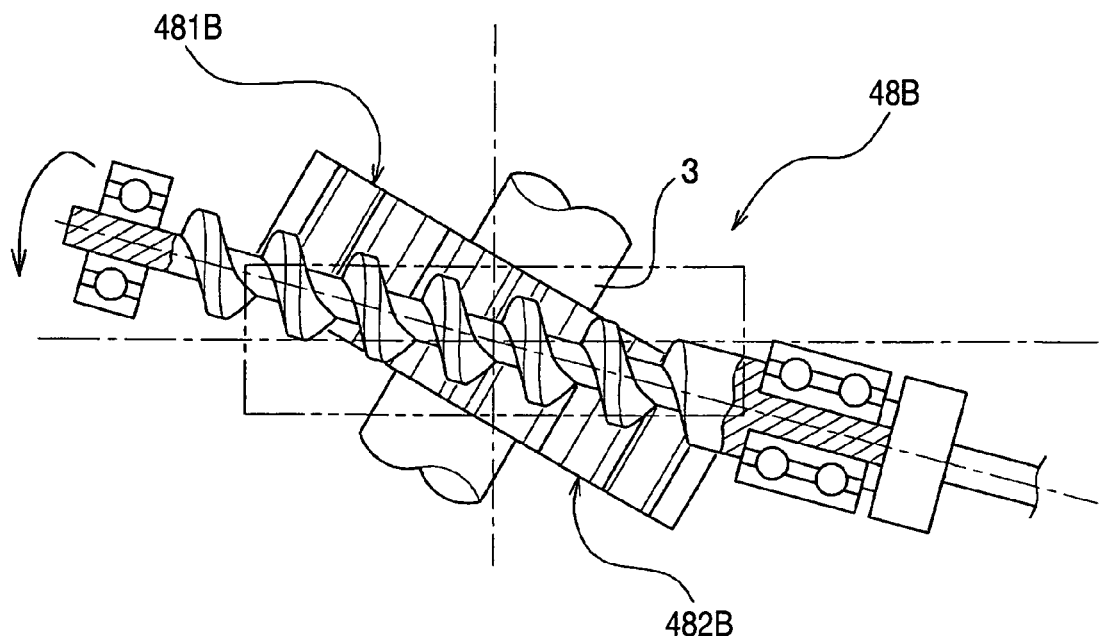
FIG. 17 is a schematic diagram showing another variation of the electric power steering apparatus according to the embodiment of the present invention, in which a principal portion thereof is enlarged to show a state of inclined engagement of a single thread worm gear with a worm wheel.

FIG. 17 is a schematic diagram showing another variation of the electric power steering apparatus according to the embodiment of the present invention, in which a principal portion thereof is enlarged to show a state of inclined engagement of a single thread worm gear with a worm wheel.

As shown in FIG. 17, a worm gear 481B of a reduction mechanism 48B, and a worm wheel 482B engaging with this worm gear 481B may be slanted with respect to each other by disposing a worm gear shaft 481Ba of the worm gear 481B obliquely with respect to the worm wheel 482B.

Thus, in the reduction mechanism 48B, the worm gear 481B and the worm wheel 482B are slantingly engaged with each other, and therefore, the tooth of the worm wheel 482B is located so as to be approximately in parallel to the longitudinal direction of a steering shaft 28. Hence, the positional deviation at the start of engagement of the worm gear 481B can be reduced with respect to the axial movement of the steering shaft 28. As a result, the load that can be withstood by the worm wheel 482B can be increased.

It should be noted that the present invention is also applicable to a structure (steer-by-wire structure) in which a steering wheel of a steering system and a steered road-wheel are mechanically separated from each other, and an electric motor generates all steering forces for the steered road-wheel.

What is claimed is:

1. A steering apparatus comprising:
   a drive source which supplies an auxiliary force; and
   a reduction mechanism which transmits the auxiliary force of the drive source to a steering system and comprises:
   a worm gear having a single thread tooth; and
   a worm wheel engaging with the worm gear,
   wherein a plane orthogonal to an axial direction of the worm gear is defined as (W),
   a tangent line at an engagement point A between the worm gear and the worm wheel, which appears in a cross section (W-W) of the worm gear along the plane (W), is defined as (C),
   a rotation center of the worm gear is defined as (D), and
   a straight line, which passes through the rotation center (D), which is parallel to a straight line perpendicular to the tangent line (C), and which is located on the plane (W), is defined as (E),
   the worm gear has a shape in which the straight line (E) intersects with an outer periphery of the tooth of the worm gear on the plane (W).

2. The steering apparatus according to claim 1 wherein the steering system comprises:
   a pinion shaft connected to a steering wheel; and
   a rack shaft connected to a steered road-wheel; and further comprising:
   a rack-and-pinion mechanism comprising:
   a pinion provided at the pinion shaft; and
   a rack engaging with the pinion and provided at the rack shaft,
   wherein a pressure angle of a tooth root of the rack is greater than that of a tooth tip of the rack.

3. The steering apparatus according to claim 1,
   wherein a tooth of the rack has an approximate arc shape in which the pressure angle is gradually increased from the tooth tip to the tooth root.

4. The steering apparatus according to claim 1,
   wherein in the worm gear, an arc-shaped connection is made between a tooth tip and an engagement surface engaging with a tooth of the worm wheel.

5. The steering apparatus according to claim 1,
   wherein in the cross section (W-W), the tooth of the worm gear is formed by an involute curve at a region ranging from a tooth root to a pitch circle, and is formed into an approximate arc shape at a region ranging from the pitch circle to a tooth tip.

6. The steering apparatus according to claim 1,
   wherein the worm gear is formed so that a tooth thickness thereof is thicker than a tooth thickness of the worm wheel.

7. The steering apparatus according to claim 1,
   wherein the worm gear and the worm wheel are slanted with respect to each other.

* * * * *